US011478936B2

(12) United States Patent
Tsukabe et al.

(10) Patent No.: US 11,478,936 B2
(45) Date of Patent: Oct. 25, 2022

(54) IMAGE PROCESSING APPARATUS THAT PROCESSES IMAGE PICKED UP BY IMAGE PICKUP APPARATUS ATTACHED TO ROBOT, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventors: Naoki Tsukabe, Kanagawa (JP); Hiroto Oka, Tokyo (JP); Daisuke Gunji, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 142 days.

(21) Appl. No.: 17/064,524

(22) Filed: Oct. 6, 2020

(65) Prior Publication Data

US 2021/0107161 A1    Apr. 15, 2021

(30) Foreign Application Priority Data

Oct. 9, 2019   (JP) .............................. JP2019-186153
Mar. 26, 2020  (JP) .............................. JP2020-056366

(51) Int. Cl.
*B25J 9/16*     (2006.01)
*B25J 13/08*    (2006.01)

(52) U.S. Cl.
CPC ............. *B25J 9/1697* (2013.01); *B25J 9/161* (2013.01); *B25J 9/163* (2013.01); *B25J 13/088* (2013.01)

(58) Field of Classification Search
CPC . B25J 9/1697; B25J 9/161; B25J 9/163; B25J 13/088; B25J 19/023; B25J 13/06; G05B 2219/39057; G05B 2219/39391
(Continued)

(56) References Cited

U.S. PATENT DOCUMENTS 4,891,767 A * 1/1990 Rzasa ................... B25J 9/1692
                                                           901/30
5,297,238 A * 3/1994 Wang .................... B25J 9/1697
                                                           700/254
(Continued)

FOREIGN PATENT DOCUMENTS

JP    4221014 B2    2/2009
JP    5272617 B2    8/2013

OTHER PUBLICATIONS

Extended European Search Report issued in European Appln. 20200711.8 dated Mar. 9, 2021.
(Continued)

*Primary Examiner* — Jaime Figueroa
(74) *Attorney, Agent, or Firm* — Rossi, Kimms & McDowell LLP

(57) ABSTRACT

An image processing apparatus capable of simplifying operations for determining an image pickup posture of an image pickup apparatus attached to a robot. The image processing apparatus processes an image that an image pickup apparatus attached to a robot picks up. The image processing apparatus includes a memory device that stores a set of instructions, and at least one processor that executes the set of instructions to specify a working area of the robot based on teaching point information showing a plurality of designated teaching points, specify an image pickup area of the image pickup apparatus so as to include the specified working area; and determine an image pickup posture of the robot based on the specified image pickup area.

16 Claims, 16 Drawing Sheets

(58) Field of Classification Search
USPC .............. 700/245–264; 318/568.11–568.25
See application file for complete search history.

(56) References Cited

U.S. PATENT DOCUMENTS

| | | | | |
|---|---|---|---|---|
| 5,579,444 | A * | 11/1996 | Dalziel | B25J 9/1697 382/153 |
| 6,362,813 | B1 * | 3/2002 | Worn | B25J 9/1656 345/169 |
| 6,529,852 | B2 * | 3/2003 | Knoll | B25J 9/1692 702/150 |
| 7,151,848 | B1 * | 12/2006 | Watanabe | B25J 9/1697 382/141 |
| 7,298,385 | B2 * | 11/2007 | Kazi | B25J 9/1671 700/254 |
| 7,720,573 | B2 | 5/2010 | Yamada | |
| 8,437,535 | B2 * | 5/2013 | Boca | G01S 17/875 382/154 |
| 8,559,699 | B2 * | 10/2013 | Boca | B25J 9/1697 382/153 |
| 8,606,400 | B2 * | 12/2013 | Izumi | B25J 9/1697 414/217 |
| 10,753,738 | B2 * | 8/2020 | Wakabayashi | B25J 13/087 |
| 10,882,189 | B2 * | 1/2021 | Matsuura | B25J 9/1671 |
| 2005/0049749 | A1 * | 3/2005 | Watanabe | G05B 19/4083 700/245 |
| 2005/0075752 | A1 * | 4/2005 | Ban | G05B 19/4182 700/213 |
| 2005/0102060 | A1 * | 5/2005 | Watanabe | G05B 19/4083 700/245 |
| 2005/0166413 | A1 * | 8/2005 | Crampton | G01B 5/008 33/503 |
| 2006/0072809 | A1 * | 4/2006 | Hashimoto | B25J 9/1697 382/153 |
| 2009/0289591 | A1 * | 11/2009 | Kassow | B25J 18/00 901/3 |
| 2014/0229005 | A1 * | 8/2014 | Suzuki | B25J 9/1692 700/254 |
| 2016/0151915 | A1 * | 6/2016 | Nishi | B25J 9/1697 901/6 |
| 2016/0332297 | A1 * | 11/2016 | Sugaya | G06F 3/04842 |
| 2018/0304467 | A1 * | 10/2018 | Matsuura | B25J 9/1697 |
| 2018/0354137 | A1 * | 12/2018 | Sirkett | B25J 9/1692 |
| 2020/0167886 | A1 * | 5/2020 | Cho | G06T 7/33 |
| 2020/0398435 | A1 * | 12/2020 | Okura | B25J 9/1697 |

OTHER PUBLICATIONS

Triggs "Automatic Camera Placement for Robot Vision Tasks" IEEE International Conference on Robotics and Automation. May 21, 1995: pp. 1732-1737. Cited in NPL 1.

Siciliano "Visual Servoing" Robotics: Modelling, Planning and Control. 2009: pp. 407-467. Cited in NPL 1.

Chen "Active vision in robotic systems: A survey of recent developments" The International Journal of Robotics Research. 2011: pp. 1343-1377. Cited in NPL 1.

* cited by examiner

RELATION BETWEEN IMAGE PICKUP SURFACE AND THREE DIMENSIONAL POSITION IN IMAGE-PICKUP-APPARATUS COORDINATE SYSTEM 603

IMAGE PROCESSING APPARATUS THAT PROCESSES IMAGE PICKED UP BY IMAGE PICKUP APPARATUS ATTACHED TO ROBOT, CONTROL METHOD THEREFOR, AND STORAGE MEDIUM STORING CONTROL PROGRAM THEREFOR

BACKGROUND OF THE INVENTION

Field of the Invention

The present invention relates to an image processing apparatus that processes an image picked up by an image pickup apparatus attached to a robot, a control method therefor, and a storage medium storing a control program therefor.

Description of the Related Art

A robot to which a camera is attached is used for a purpose of production of a product, a quality identification, conveyance, etc. A workpiece as a working target is inspected and measured, for example, by applying an image process to an image picked up by the camera. The robot is able to work freely within a predetermined working area. Accordingly, when the robot operates the workpiece within the predetermined working area, an image pickup posture of the robot should be determined so that the camera can suitably pick up the working area within which the robot works.

U.S. Pat. No. 7,720,573 (Japanese Patent No. 4221014) discloses a robot control apparatus as a related technique. The robot control apparatus has a control apparatus body fixedly installed and connected to the robot and a portable teaching pendant connected to the control apparatus body. Then, a user is able to operate the robot with the teaching pendant.

In order to determine the image pickup posture of the robot where the camera is able to pick up the working area of the robot appropriately, check of the visual observation by a user and adjustment of the image pickup posture of the robot are performed repeatedly, for example. In this case, the user checks an image that the camera picked up and adjusts a tilt and position of an arm of the robot to which the camera is attached. The user is needed to repeat checking of an image and adjustment of the robot until the camera attached to the robot picks up the working area of the robot appropriately. This is troublesome.

Moreover, the robot is able to work while performing correction corresponding to a variation and displacement of the workpiece by feeding back a result that the camera picks up to the control of the robot. However, when the amounts of variation and displacement of the workpiece in the image are fed back to the control of the robot, it is necessary to determine a correction parameter for converting a position and posture of the robot in the image into a position and posture in a robot coordinate.

Japanese Patent No. 5272617 discloses a robot control apparatus as a related technique. This robot control apparatus detects a contact of a finger of a manipulator to a contact point on a plane on which a working target is positioned and corrects a position of a robot by picking up a marker provided on the plane with a camera.

For example, calibration using an optical marker is known as one of methods for determining the correction parameter for converting the position and posture of the robot in the image into the position and posture in the robot coordinate. When the calibration using the optical marker is used, a user installs the optical marker of which shape is known within the working area. Then, the correction parameter is determined by applying a predetermined image process to the image that the camera picked up. In this case, since the user needs to make the optical marker and to perform the calibration work using the optical marker, the correction becomes complicated.

SUMMARY OF THE INVENTION

The present invention provides an image processing apparatus that simplifies operations for determining an image pickup posture of an image pickup apparatus attached to a robot. Moreover, one embodiment of the present invention provides an image processing apparatus that simplifies operations for determining a correction parameter used for converting a coordinate of a picked-up image into a coordinate of a robot.

Accordingly, a first aspect of the present invention provides an image processing apparatus that processes an image that an image pickup apparatus attached to a robot picks up. The image processing apparatus includes a memory device that stores a set of instructions, and at least one processor that executes the set of instructions to specify a working area of the robot based on teaching point information showing a plurality of designated teaching points, specify an image pickup area of the image pickup apparatus so as to include the specified working area, and determine an image pickup posture of the robot based on the specified image pickup area.

Accordingly, a second aspect of the present invention provides an image processing apparatus that processes an image that an image pickup apparatus attached to a robot picks up. The image processing apparatus includes a memory device that stores a set of instructions, and at least one processor that executes the set of instructions to display a screen including an entry field to which teaching points are entered and a first button that designates execution of a process that determines an image pickup posture of the robot, specify a working area of the robot based on teaching point information showing the entered teaching points, specify an image pickup area of the image pickup apparatus so as to include the specified working area, and determine an image pickup posture of the robot based on the specified image pickup area when the first button is operated.

Accordingly, a third aspect of the present invention provides a control method for an image processing apparatus that processes an image that an image pickup apparatus attached to a robot picks up. The control method includes specifying a working area of the robot based on teaching point information showing a plurality of designated teaching points, specifying an image pickup area of the image pickup apparatus so as to include the specified working area, and determining an image pickup posture of the robot based on the specified image pickup area.

Accordingly, a fourth aspect of the present invention provides a non-transitory computer-readable storage medium storing a control program causing a computer to execute the control method of the third aspect.

According to the present invention, the operations for determining the image pickup posture of the image pickup apparatus attached to the robot are simplified. According to one embodiment of the present invention, the operations for determining a correction parameter used for converting the coordinate of the picked-up image into the coordinate of the robot are simplified.

Further features of the present invention will become apparent from the following description of exemplary embodiments with reference to the attached drawings.

DESCRIPTION OF THE EMBODIMENTS

Figure 1:
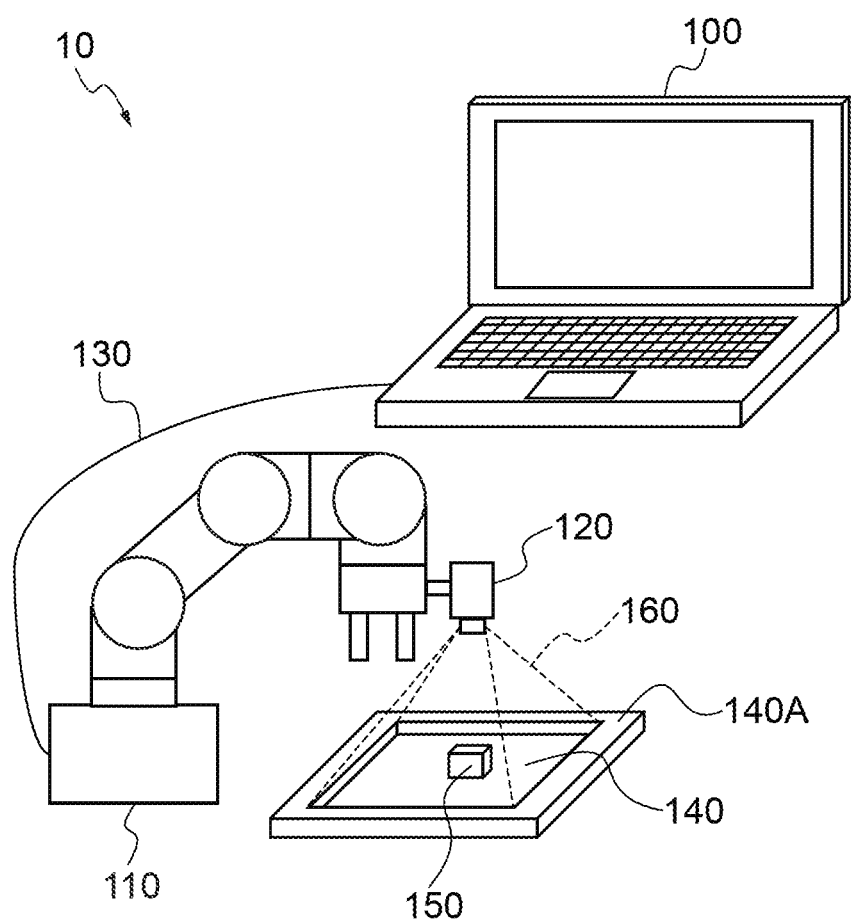
FIG. 1 is a view showing an entire configuration of a robot system concerning a first embodiment of the present invention.

Hereafter, embodiments according to the present invention will be described in detail by referring to the drawings. Configurations described in the following embodiments are only examples, and the scope of the present invention is not limited by the configurations described in the embodiments.

Hereinafter, a first embodiment of the present invention will be described. FIG. 1 is a view showing the entire configuration of a robot system 10 concerning the first embodiment of the present invention. The robot system 10 may be called a robot device as a whole. The robot system 10 has an image processing apparatus 100, a robot 110, and an image pickup apparatus (a camera) 120. The configuration of the robot system 10 is not limited to the example of FIG. 1. The image pickup apparatus 120 is a camera that obtains electromagnetic wave information (light information) in an image pickup area 160 as an image (a picked-up image, a camera image). The image pickup apparatus 120 is attached to a predetermined position of the robot 110. The image pickup apparatus 120 is attached near a tip of the robot 110 in the example of FIG. 1.

A relative relation between the attached position of the image pickup apparatus 120 to the robot 110 and the position of the image pickup apparatus 120 is fixed. In the example of FIG. 1, the robot 110 has a multiple joint arm and can work in a predetermined working area. A user can change a position and posture of the robot 110 manually, and a drive unit 214 mentioned later also can change them. The position of the robot 110 in this embodiment shall indicate the position of the tip of the arm of the robot 110 by a predetermined coordinate system (X, Y, Z), and the posture of the robot 110 shall indicate the posture of the tip of the arm by a predetermined coordinate system (pitch, roll, yaw).

The image processing apparatus 100, the robot 110, and the image pickup apparatus 120 are connected so as to be communicable to exchange information. The working area 140 is prepared by estimating that the robot 110 operates a workpiece 150. The workpiece 150 is a target that is operated by the robot 110 and is arranged in various states (directions) within the working area 140. The image pickup apparatus 120 picks up an image of the workpiece 150 from a predetermined image pickup position. The image processing apparatus 100 estimates the position, posture, or type of the workpiece on the basis of the obtained picked-up image.

The image processing apparatus 100 performs various kinds of processes and transmits a control amount to the robot 110 so as to move the tip of the arm to the position of the workpiece 150. The robot 110 moves the tip of the arm to the position of the workpiece 150 on the basis of the received control amount. The image processing apparatus 100 controls the robot 110 so as to perform a different operation corresponding to a state of the workpiece 150 by changing the control amount according to the state of the workpiece 150. Two or more workpieces 150 may be included in the working area 140.

Hereinafter, the above-mentioned image pickup posture will be described. The image pickup posture is a position and posture of the tip of the robot 110 at a time of picking up an image for recognizing the workpiece 150 and shall be determined before operating the workpiece 150. Furthermore, postures of joints of the arm may be taken into consideration. The robot 110 in this embodiment always shifts to the image pickup posture when picking up an image and picks up an image at the same field angle.

The position of the workpiece 150 in a camera coordinate (the position of the workpiece in the image) is converted into a position of the workpiece in a robot coordinate so as to enable an operation of the robot 110 to the workpiece 150. Details will be mentioned later. The nearer the image pickup posture to the workpiece 150 is, i.e., the nearer the image pickup apparatus 120 to the surface of the working area 140 is, the higher a resolution of the picked-up image of the workpiece 150 is, which improves accuracy of recognition. In the meantime, the nearer the image pickup apparatus 120 to the surface of the working area 140 is, the narrower an image pickup field angle is, which increases a possibility that the workpiece 150 cannot be included in a field angle. That is, the image pickup posture is preferably determined so that the workpiece 150 can be included in the field angle certainly and the workpiece 150 can be picked up at a position as near as possible.

Figure 2C:
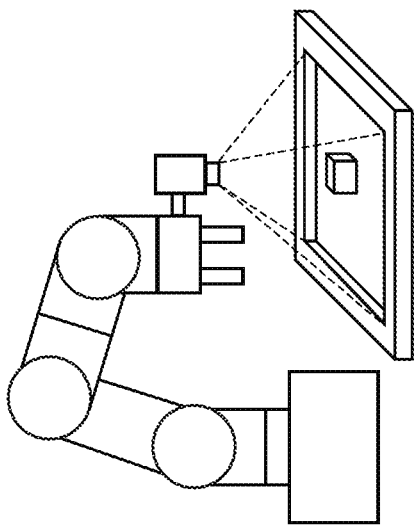
FIG. 2A through FIG. 2C are views showing a flow for determining an image pickup posture in the robot system concerning the first embodiment.
Figure 2B:
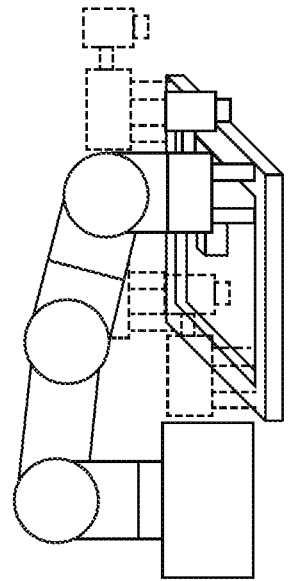
Figure 2A:
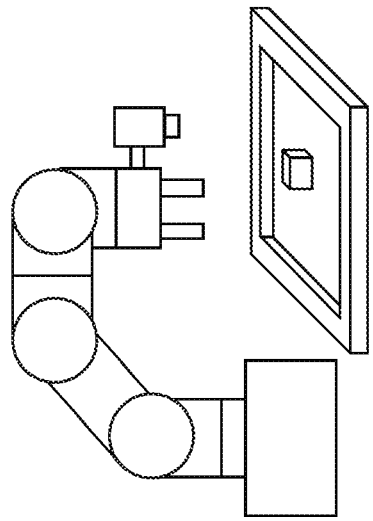

Summary of a determination method of the image pickup posture in the first embodiment will be described based on the above. FIG. 2A through FIG. 2C are views showing a flow until determining the image pickup posture. A user installs the robot 110 at a desired position so that the robot 110 can operate the workpiece 150 within the working area 140. That is, the user installs the robot 110 at the position where the working area 140 is estimated to be a movable area of the robot 110 (FIG. 2A).

In this embodiment, the robot 100 shall be a portable robot of 20 kg or less that the user can move. However, the robot 110 may not be a portable robot. After installation of the robot 110, the user checks whether the robot 110 can work within the working area (robot working area) 140. At this time, the user checks by operating the robot 110 (FIG. 2B). For example, the user moves the arm to four corners of the working area 140 in order and checks whether the arm takes an operatable posture at each of the corners. Then, the image pickup posture is determined by a process of this embodiment (FIG. 2C). Details of the determination of the image pickup posture will be mentioned later.

The user can register the points to which the arm of the robot 110 is moved (the four corners of the working area 140, for example) in the operation shown in FIG. 2B as teaching points. The image processing apparatus 100 specifies image pickup area information that shows the working area from these teaching points and specifies image pickup area information that shows the image pickup area 160 including the area that the specified working area information shows. The image processing apparatus 100 determines the image pickup posture of the robot 110 on the basis of the specified image pickup area information. That is, the image pickup posture is automatically determined so that the area corresponding to the working area 140 is included in the image pickup area 160. This is because the field angle in which the working area 140 is included exactly is a field angle that certainly includes the workpiece 150 and that enables to pickup the workpiece 150 nearby. Accordingly, the image pickup posture of the robot 110 is determined uniquely without repeating feedback of the result of the visual observation by the user and the result of image process that are obtained by repeating the operation of the robot 110.

Figure 3:
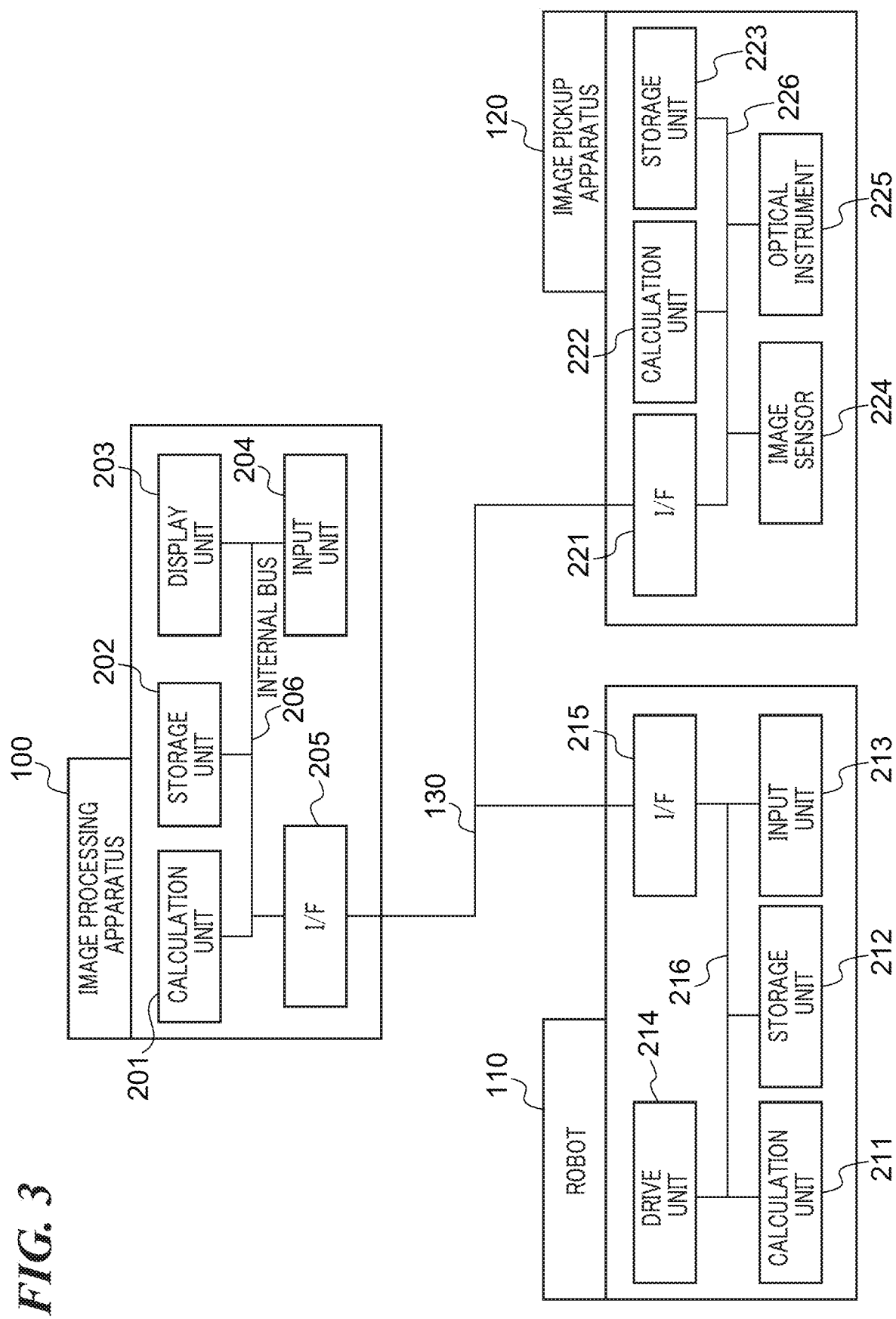
FIG. 3 is a hardware configuration view showing the robot system including an image processing apparatus, a robot, and an image pickup apparatus, concerning the first embodiment.

FIG. 3 is a hardware configuration view showing the image processing apparatus 100, robot 110, and image pickup apparatus 120 of the embodiment. The image processing apparatus 100, robot 110, and image pickup apparatus 120 are connected by a signal transmission unit 130 so as to enable mutual communication of information.

The image processing apparatus 100 is a computer that has an image processing function. The image processing apparatus 100 has a calculation unit 201, a storage unit 202, a display unit 203, an input unit 204, an external interface 205, and an internal bus 206. The interface is indicated as "I/F" in FIG. 3. The calculation unit 201 is constituted by a CPU (Central Processing Unit) and a GPU (Graphical Processing Unit). The storage unit 202 is constituted by storage devices, such as a ROM (Read Only Memory), a RAM (Random Access Memory), an HDD (Hard Disk Drive), and an SSD (Solid State Drive). The display unit 203 is an LCD unit, a projector, or the like. The input unit 204 may include a mouse, a keyboard, a touch panel, etc. The external interface 205 is constituted by a USB (Universal Serial Bus), the Ethernet (registered trade mark), etc., and is used for input and output of information. The internal bus 206 is control lines, such as a data bus and an address bus, for connecting the units inside the image processing apparatus 100.

The storage unit 202 stores program that achieve various controls of the embodiment. For example, when the calculation unit 201 runs the programs, various processes of the embodiment are achieved. Thereby, the image processing apparatus 100 performs an image process, transmits a robot operation command to the robot 110, and obtains an image from the image pickup apparatus 120, for example. Moreover, a user is able to perform various settings and instruct execution of a process using the display unit 203 and input unit 204.

Next, the robot 110 will be described. The robot 110 has a calculation unit 211, a storage unit 212, an input unit 213, a drive unit 214, an external interface 215, and an internal bus 216. Since the units other than the drive unit 214 are identical to the units of the image processing apparatus 100, their descriptions are omitted. The drive unit 214 has an actuator, reduction gears, a linkage mechanism, etc. The calculation unit 211 performs various kinds of control, such as control of the drive unit 214 and response to the external interface 215, by running the program stored in the storage unit 212.

The storage unit 212 stores information needed to control the robot 110, including lengths of links, movable directions and movable ranges of joints that connect the links. The calculation unit 211 estimates a position and posture of a hand (the tip of the arm) of the robot 110 from operating command values issued to the joints and actuators of the robot 110. Moreover, the position and posture of the hand of the robot 110 are designatable. The calculation unit 211 estimates the operating command values issuing to the respective joints of the robot 110 on the basis of the position and posture of the hand designated to the robot 110.

Moreover, the storage unit 212 stores the information about the position and posture of the hand of the robot 110, and thereby, stores the teaching points of the robot 110. The information about the position and posture of the hand of the robot 110 may be entered as numerical values from a user's operation using the input unit 213 or from an external apparatus. Moreover, the storage unit 212 stores the current position and posture of the hand of the robot 110 in response to a users operation. A teaching point is information used for specifying the position and posture of the robot 110 that are expressed by a posture expression by an XYZ rectangular coordinate or an Euler angle with respect an origin (robot origin) in the robot coordinate system, joint direction flags for a redundant posture, and a joint angle of each axis.

Next, the image pickup apparatus 120 will be described. The image pickup apparatus 120 has an external interface 221, a calculation unit 222, a storage unit 223, an image sensor 224, and an optical instrument 225. Since the units other than the image sensor 224 and optical instrument 225 are identical to the units of the image processing apparatus 100 and the robot 110, their descriptions are omitted. The image sensor 224 is constituted by a CCD (Charge Coupled Device) image sensor, a CMOS (Complementary Metal Oxide Semiconductor) image sensor, or a MOS (Metal Oxide Semiconductor) image sensor. The optical instrument 225 guides light entering into the image pickup apparatus 120 to the image sensor 224. The calculation unit 222 responds to the external interface 221, generates an image on the basis of information obtained from the image sensor 224, and controls optical characteristics, such as focus and a field angle, of the optical instrument 225, for example.

Although FIG. 1 and FIG. 3 show the example in which the image processing apparatus 100, robot 110, and image pickup apparatus 120 are constituted as independent components, these apparatuses may be constituted as one component. Moreover, each process of the embodiment may be performed by a predetermined external apparatus (for example, a cloud server, an edge computer, etc.). For example, the image processing apparatus 100 shall be communicable with the predetermined external apparatus. The image processing apparatus 100 transmits information needed to the process of the embodiment to the predetermined external apparatus. The predetermined external apparatus performs the process of the embodiment and transmits a processing result to the image processing apparatus 100. Such a configuration also achieves the process of the embodiment. Moreover, the process of the embodiment may be achieved by a virtual environment like a simulator.

Figure 4:
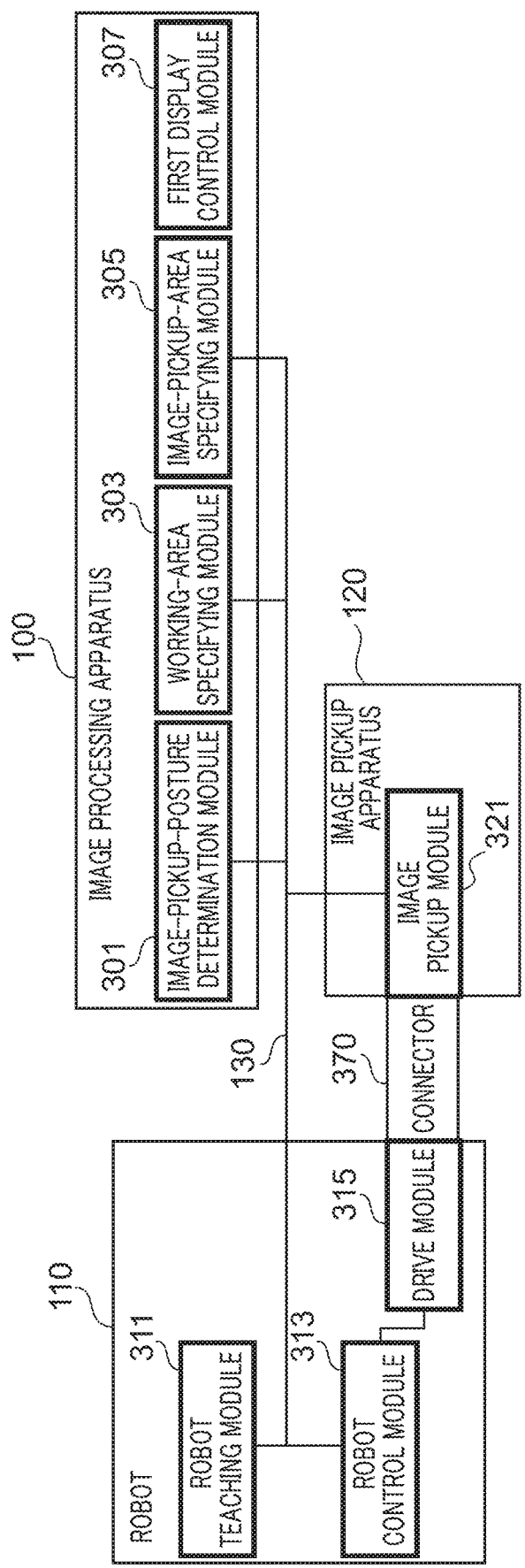
FIG. 4 is a block diagram showing functions of the image processing apparatus, robot, and image pickup apparatus in the robot system concerning the first embodiment.

Next, functions of the image processing apparatus 100, robot 110, and image pickup apparatus 120 will be described. FIG. 4 is a block diagram showing the functions of the image processing apparatus 100, robot 110, and image pickup apparatus 120. The robot 110 has a robot teaching module 311, robot control module 313, and drive module 315. The functions of the robot teaching module 311 and robot control module 313 are achieved by the program that the calculation unit 211 runs.

The robot control module 313 will be described first. The robot control module 313 transmits the control amount for each actuator of the robot 110 to the drive module 315. The drive module 315 corresponds to the drive unit 214 in FIG. 3. The storage unit 212 of the robot 110 beforehand stores robot parameter information that includes lengths of links of the robot 110, movable directions and movable ranges of joints that connect the links. The robot control module 313 bidirectionally converts a control amount of each actuator and the position and posture of the hand of the robot 110 using the robot parameter information and predetermined kinematic methods (forward kinematics, inverse kinematics, etc.).

When a predetermined input terminal is connected to the external interface 215 of the robot 110, a user is able to set the tip of the arm of the robot 110 at a desired position and posture by operating the input terminal. The input terminal is a teaching pendant or a tablet terminal that has a function of the teaching pendant, for example. The robot control module 313 receives the operation to the input terminal and sets the tip of the arm of the robot 110 at a desired position and posture.

A predetermined instrument, such as an effector or a tool, may be attached at the tip of the robot 110 (the tip of the arm). In this case, the position and posture of the tip of the robot 110 vary depending on the shape of the instrument attached at the tip of the arm of the robot 110. In this case, a correction that adds a length from the tip position of the robot 110 to the position of the instrument as an offset may be performed. Moreover, the robot control module 313 may control the position and posture of the tip of the instrument as the position and posture of the hand of the robot 110 by changing a length of a joint used in the kinematic calculation.

Next, the robot teaching module 311 will be described. The robot teaching module 311 stores information about the specific position and posture of the robot 110 into the storage unit 212 as teaching point information (information showing teaching points). Thereby, the teaching points are registered. Moreover, when the robot teaching module 311 reads the teaching point information stored in the storage unit 212, the robot control module 313 is able to work the robot 110 so that the position and posture of the robot 110 that the read teaching point information shows can be reproduced. For example, when a user manually moves the arm of the robot 110 and operates to register a teaching point, the position and posture of the tip of the arm of the robot 110 at the time of the operation is registered as a teaching point. It should be noted that a teaching point to be registered is not limited to the current position and posture of the tip of the arm of the robot 110. A teaching point may be registered by entering a numerical value or may be registered by simulation in a virtual space.

Next, the image processing apparatus 100 will be described. The image processing apparatus 100 obtains a picked-up image that the image pickup apparatus 120 picked up and performs an image process. Moreover, the image processing apparatus 100 has an image-pickup-posture determination module 301, a working-area specification module 303, an image-pickup-area specification module 305, and a first display control module 307. At the beginning, the image-pickup-area specification module 305 is described. The image-pickup-area specification module 305 corresponds to a second specification means. The image-pickup-area specification module 305 specifies an image pickup area 160 including the working area 140 with using the various kinds of information stored in the storage unit 202. Hereinafter, the various kinds of information used for specifying the image pickup area 160 is described as what is stored in the storage unit 202 of the image processing apparatus 100. In the meantime, the various kinds of information used for specifying the image pickup area 160 may be stored in an external apparatus. In such a case, the image processing apparatus 100 obtains the various kinds of information by communication.

The storage unit 202 of the image processing apparatus 100 stores various kinds of information used for estimating a relation between a point in the three dimensional space in the visual field and a position in the picked-up image to which the point is projected when an image pickup unit 321 of the image pickup apparatus 120 picks up the image. The relation between a position in the three-dimensional space picked up by the image pickup unit 321 and a position in the picked-up image is expressed by an internal parameter and an external parameter determined by the position and posture of the image pickup unit 321. The image pickup apparatus 120 is fixed to a predetermined link of the robot 110 through a mechanical connector 370.

The drive module 315 finds the external parameter by a predetermined kinematic method on the basis of the robot parameter information to the link to which the connector 370 is attached and the relative position and posture of the image pickup apparatus 120 with respect to the link to which the connector 370 is attached. The various kinds of information stored in the storage unit 202 include the internal parameter determined by an optical property of the optical instrument 225. Moreover, the various kinds of information include the robot parameter information mentioned above and information about a position and posture of a coordinate system origin of the image pickup apparatus 120 fixed by the connector 370 with respect to the link of the robot 110. The connector 370 is a shaft that connects the link of the robot 110 and the image pickup apparatus 120, for example.

The various kinds of information mentioned above may be found from design values and may be found by an arbitrary identification method. The robot parameter information includes the information (the robot parameter information used for presumption of the external parameter) that is shared between the robot control module 313 and the image-pickup-area specification module 305. The robot parameter information may be stored in either of the storage unit 202 of the image processing apparatus 100 and the storage unit 212 of the robot 110, or may be stored in the both. When the robot parameter information is stored in one storage unit, the image processing apparatus 100 or the robot 110 may refer to the robot parameter information stored in the storage unit of the other apparatus.

Figure 5:
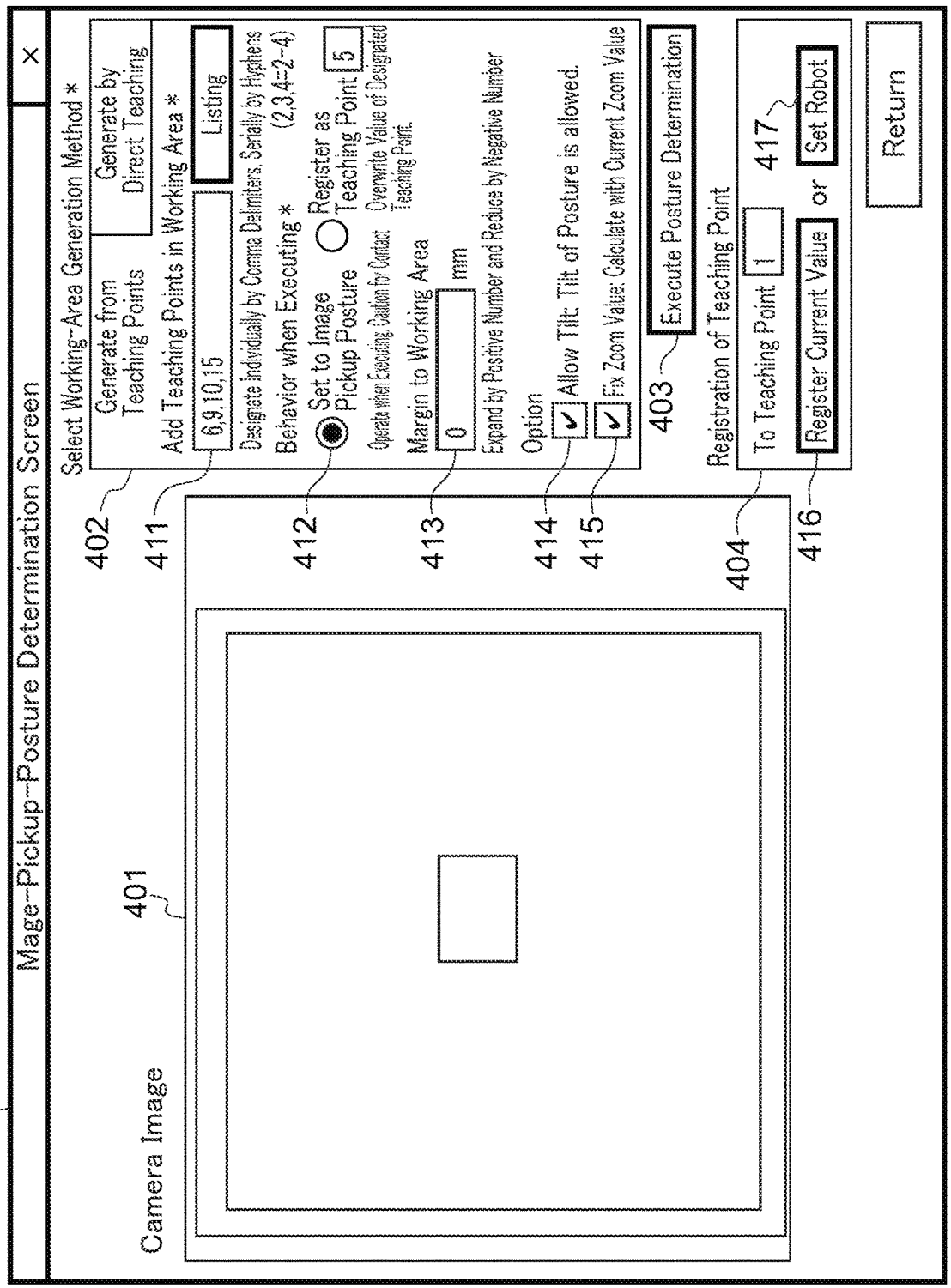
FIG. 5 is a view showing an example of an image pickup posture determination screen displayed on a display device of the image processing apparatus.

The working-area specification module 303 generates the working area information using the information about a plurality of teaching points designated by the user. The working-area specification module 303 corresponds to a first specification means. The working area information is a robot teaching point group constituted by the teaching points, or a point group, surface information, or depth information that is generated by extending, connecting, or approximating the robot teaching point group. Details of the working area information are mentioned later. The first display control module 307 of the image processing apparatus 100 displays an operation screen of GUI (Graphical User Interface) as shown in FIG. 5 on the display unit 203. The GUI is used when the teaching point information used for generating the working area information is entered.

In the above-mentioned GUI, the serial numbers associated with the teaching points can be designated, and the working-area specification module 303 generates working area information on the basis of the information about the designated teaching points using a polygon mesh or various approximation methods. Moreover, in the above-mentioned GUI, a margin to the working area 140 can be designated arbitrarily, and the working-area specification module 303 expands or reduces the working area information according to the designated margin, For example, a characteristic part of the workpiece 150 that is a target detected by the image process may be outside the working area by the width of the workpiece 150. Even in this case, such a workpiece 150 can be treated as being inside the working area by designation of the margin. Moreover, the working-area specification module 303 can expand or reduce the working area information using size information about the workpiece 150 that is a detection target and a size of an instrument attached to the robot 110. Thereby, the time and effort of setting is saved.

Next, the image-pickup-posture determination module 301 will be described. The image-pickup-posture determination module 301 corresponds to a first determination means. The image-pickup-posture determination module 301 determines the image pickup posture of the robot 110 on the basis of the working area information and the image pickup area information. In this embodiment, the image-pickup-posture determination module 301 finds a relation that defines an area to which the working area 140 is projected in the image with respect to the posture of the robot 110 on the basis of the working area information, the robot parameter information, and the image pickup area information. Thereby, the image-pickup-posture determination module 301 determines the image pickup posture of the robot 110. A determination method for the image pickup posture will be mentioned later. The image pickup posture defines the position and posture of the robot 110 that are suitable for picking up the area shown by the working area information. When the robot 110 is in the image pickup posture, the image pickup area 160 includes the entire area shown by the working area information. As mentioned above, the optimal image pickup posture defines the position and posture of the robot 110 where the image pickup area 160 includes the entire working area 140 and the resolution of the picked-up image is high.

The image-pickup-posture determination module 301 may find the image pickup posture analytically or numerically using the size of the working area 140 that is projected to the picked-up image and the size of the area that is not projected as evaluation indices, for example. Moreover, the image-pickup-posture determination module 301 may find the image pickup posture by finding the minimum circumscribed rectangle of the view field to the working area 140 while limiting the image pickup posture by projecting onto a proximate plane. The image-pickup-posture determination module 301 may determine the image pickup posture that satisfies the conditions input into a GUI that allows selection of a restriction condition, a solution, etc. in arbitrary posture determination.

FIG. 5 is a view showing an example of an operation screen (an image pick-up posture determination screen 400) of the above-mentioned GUI. The first display control module 307 performs display control of the screen displayed on the display unit 203. The first display control module 307 corresponds to a first display control means. A user is able to input and select various values by operating the input unit 204 in the state where the image pick-up posture determination screen 400 is displayed on the display unit 203. The image pick-up posture determination screen 400 includes an image display region 401, a first interface 402, an execution button 403, and a second interface 404. The first interface 402 and the second interface 404 are provided as setting items.

The screen example of the image pick-up posture determination screen 400 is not limited to the example of FIG. 5. The picked-up image that the image pickup unit 321 of the image pickup apparatus 120 is picking up is displayed on the image display region 401. In the example of FIG. 5, the picked-up image is indicated as a camera image. The first interface 402 is an interface for specifying the working area 140. The first interface 402 includes a teaching point entry field 411, radio button 412, margin setting field 413, first check box 414, and second check box 415.

The teaching point entry field 411 is a box for entering teaching points for generating the working area information. The teaching point entry field 411 corresponds to the input unit. The storage unit 212 of the robot 110 stores the information about a plurality of teaching points. In this embodiment, the storage unit 212 stores the plurality of teaching points to which serial numbers are respectively associated. When the serial numbers of the teaching points are entered into the teaching point entry field 411, the working-area specification module 303 specifies the working area 140. In the example of FIG. 5, the area constituted by the teaching points corresponding to the serial numbers "6", "9", "10", and "15" becomes an area indicated by the working area information.

A teaching point may be specified by a serial number input to the teaching point entry field 411, or may be specified by selection from a list form dialog. Serial numbers of teaching points can be input to the teaching point entry field 411 using a comma or a hyphen. When the serial numbers are input with a hyphen, the serial numbers of the teaching points can be designated collectively.

The radio button 412 is used for selecting a behavior of the robot 110 corresponding to press of the execution button 403. In the example of FIG. 5, one of two choices "Set to Image Pickup Posture" and "Register as Teaching Point" is selectable. When the execution button 403 is pressed in the state where "Set to Image Pickup Posture" is selected, the robot 110 is be set to the determined image pickup posture. When the execution button 403 is pressed in the state where "Register as Teaching Point" is selected, the robot does not work and the determined image pickup posture is registered as a teaching point.

The margin setting field 413 is provided in order to input the margin of the working area 140 to the image pickup area 160. An initial value of the margin is set to "0". When the margin is "0", the area shown by the working area information that is found from the teaching points input into the teaching point entry field 411 becomes the image pickup area 160. A positive value or a negative value can be input into the margin setting field 413. When a positive value is input into the margin setting field 413, the area shown by the working area information that is found from the teaching points is expanded, and the expanded area becomes the image pickup area 160. In this case, although a possibility that the working area 140 is included within the image pickup area 160 with an enough margin becomes high, the resolution of the picked-up image becomes low.

In the meantime, when a negative value is input into the margin setting field 413, the area shown by the working area information that is found from the teaching points is reduced, and the reduced area becomes the image pickup area 160. In this case, a possibility that the working area 140 becomes larger than the image pickup area 160 becomes high.

In the first embodiment, the image pickup area 160 needs to cover the working area 140 in which the robot 110 works. The working area 140 is specified on the basis of teaching points. For example, when the workpiece 150 that is a working target of the robot 110 is mounted on a mounting base (for example, a tray) as shown in FIG. 1, an edge 140A of the tray does not become the working area of the robot 110 approximately. At this time, when teaching points are designated at the edge 140A of the tray (when the user moves the tip of the arm of the robot to the positions on the edge of the tray in FIG. 2B), the working area specified by the teaching points is wider than the actual working area 140. Accordingly, the input to reduce the image pickup area 160 is permitted to the margin setting field 413 in the image pick-up posture determination screen 400. When the image pickup area 160 is reduced, the resolution of the picked-up image becomes higher.

The image pick-up posture determination screen 400 in FIG. 5 includes the first check box 414 and the second check box 415. The first check box 414 is used for designating whether a tilt of the image pickup posture is allowed when re-calculating the image pickup posture. For example, when there is an obstacle etc. around the robot 110, it may be preferable that the robot 110 moves the arm only in the vertical direction. In such a case, the first check box 414 is unchecked. That is, a tilt of the image pickup posture is not permitted. In the meantime, when the first check box 414 is checked, a tilt of the image pickup posture is permitted.

As mentioned above, the image processing apparatus 100 controls the robot 110 into the position and posture so that the image pickup area 160 includes the area shown by the working area information. When a tilt of the image pickup posture is permitted, the image pickup apparatus 120 is able to pick up an image of the working area 140 from various angles. Accordingly, when a tilt of the image pickup posture is permitted, a possibility of setting of the image pickup area 160 including the area shown by the working area informa-tion becomes high as compared with the case where no tilt of the image pickup posture is permitted.

The second check box 415 is used for designating whether a zoom value of the image pickup unit 321 of the image pickup apparatus 120 is fixed. When the second check box 415 is checked, the zoom value is fixed. Some users like a fixed zoom value. In the meantime, when the zoom value is not fixed, the image pickup area 160 can be expanded and reduced by changing the zoom value. This increases the possibility of setting of the image pickup area 160 including the working area 140.

The execution button 403 is a first button for executing a process for determining the image pickup posture. As mentioned above, various setting contents for specifying the working area 140 are set in the first interface 402. When the image processing apparatus 100 receives a press operation of the execution button 403, the working-area specification module 303 generates the working area information according to the contents set in the first interface 402. The image-pickup-posture determination module 301 determines the image pickup posture on the basis of the generated working area information and the stored image pickup area information.

The second interface 404 is used for registration of a teaching point. The second interface 404 has a registration button 416 and a move button 417. A serial number of a teaching point is designatable with a text box in the second interface 404, for example. In the example of FIG. 5, the serial number of the teaching point is designated as "1". The registration button 416 is used for registering the current position and posture of the tip of the arm of the robot 110 as a teaching point.

When the registration button 416 is pressed, the current position and posture of the tip of the arm of the robot 110 are registered into the teaching point "1". The user is able to register the teaching point while checking the camera image (picked-up image that the image pickup apparatus 120 is picking up) currently displayed on the image display area 401. When the user moves the tip of the arm of the robot 110 to the four corners of the working area 140 and registers as the serial numbers "6", "9", "10", and "15" during the operation shown in FIG. 2B, the teaching points corresponding to the working area 140 are registered. It should be noted that the move button 417 is used for moving the tip of the arm of the robot 110 to the designated teaching point ("1" in FIG. 5).

Since the image pick-up posture determination screen 400 displays the image display area 401, first interface 402, execution button 403, and second interface 404 collectively, the number of times of screen transition can be reduced. As mentioned above, the picked-up image that the image pickup apparatus 120 is picking up is displayed in the image display area 401. The image processing apparatus 100 may display the area shown by the working area information in an arbitrary state by superimposing on the camera image currently displayed in the image display area 401. In this embodiment, the area shown by the working area information will be displayed so as to be mostly superimposed on the working area 140.

Moreover, the first display control module 307 may display the teaching point information showing the teaching points in an arbitrary state by superimposing on the camera image currently displayed in the image display area 401. Thereby, the user can quickly recognize a setting error of the working area information or teaching point information and a situation where the working area 140 on the camera image is not in a desired state.

Figure 6:
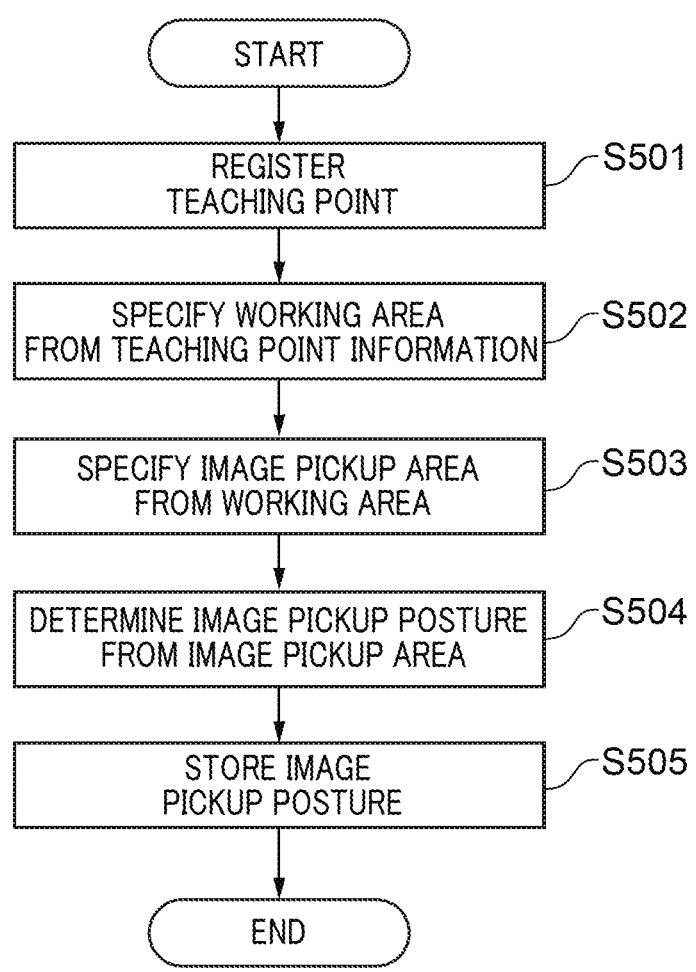
FIG. 6 is a flowchart showing a flow of a process for storing an image pickup posture in the robot system concerning the first embodiment.

Next, a process for storing an image pickup posture in a first embodiment will be described. FIG. 6 is a flowchart showing a flow of the process for storing an image pickup posture. For example, when an input terminal like a tablet terminal is connected to the external interface 205 of the image processing apparatus 100, a user operates the input terminal. When the user operates the input terminal, the robot 110 works according to an operation to the input terminal.

As mentioned above, the user operates the robot 110 to be at the position and posture of the teaching point to register, and performs the operation of registering the teaching point. When receiving the operation, the robot teaching module 311 stores the teaching point information to the storage unit 212. Thereby, the teaching point is registered (S501). The method of registration of a teaching point is not limited to the above-mentioned example. For example, a teaching point may be registered by performing registration after the user manually moves the robot 110 to the position and posture of the teaching point. Moreover, a teaching point may be registered by entering a numerical value etc.

Next, when the user performs an operation to display the image pick-up posture determination screen 400 by operating the input unit 204 of the image processing apparatus 100, the first display control module 307 displays the image pick-up posture determination screen 400 on the display unit 203. The user performs operation of designating the working area 140 to the first interface 402. At this time, the user at least performs the operation of entering a teaching point into the teaching point entry field 411. Moreover, the user can also perform designating operations to the radio button 412, the margin setting field 413, the first check box 414, and the second check box 415. The user can also directly designate a teaching point using the image pick-up posture determination screen 400. In this case, the process of S501 and a process of S502 can be performed collectively.

When the execution button 403 is pressed, the working-area specification module 303 specifies the working area on the basis of the teaching points entered into the first interface 402 (S502). When the working area 140 is correctly designated in S501, the working area specified in S502 matches the working area 140. Then, the working area information corresponding to the specified working area is generated. The working area information is denoted by the coordinate system in the actual three-dimensional space. The image pickup area information is denoted by the coordinate system of the image pickup apparatus 120. Accordingly, the image pickup area information can be specified from the working area information using the various kinds of information (an internal parameter etc.) mentioned above.

When the working area is specified in S502, the image-pickup-area specification module 305 specifies the image pickup area from the working area information (S503). When the image pickup area is specified, the image-pickup-posture determination module 301 determines the image pickup posture from the specified image pickup area (S504). Details of the processes of S502 through S504 will be described below. When the execution button 403 is pressed in the state where the radio button 412 of "Set to Image Pickup Posture" is selected, the robot 110 is set to the determined image pickup posture. The picked-up image that the image pickup apparatus 120 is picking up is displayed in the image display area 401. The user is able to check whether the determined image pickup posture of the robot 110 is an image pickup posture that the user desires by checking the picked-up image.

When receiving a user's press operation of the registration button 416 in the second interface 404, the calculation unit 201 stores the information about the teaching points corresponding to the serial numbers of the teaching points designated in the second interface 404 into the storage unit 202 (S505). When the execution button 403 is pressed in the state where the radio button 412 of "Register as Teaching Point" is selected, the processes of S503 and S504 and the process of S505 may be performed collectively.

Figure 7A:
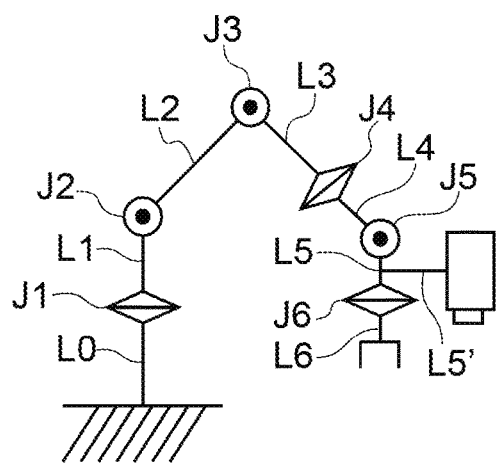
FIG. 7A through FIG. 7D are views showing an example of a model of the robot and image pickup apparatus in the robot system concerning the first embodiment.
Figure 7C:
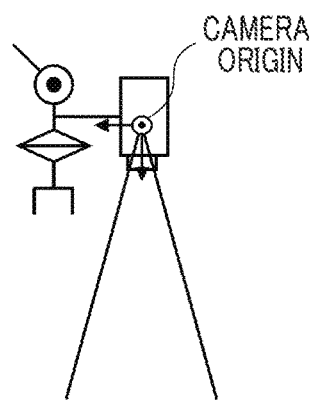
Figure 7B:
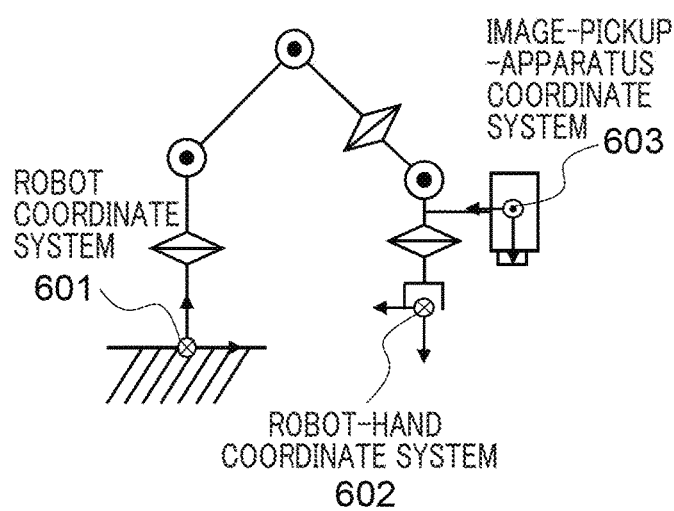

Next, models of the robot 110 and the image pickup apparatus 120 will be described. FIG. 7A through FIG. 7D show model examples of the robot 110 and the image pickup apparatus 120. In the examples of FIG. 7A through FIG. 7D, the robot 110 is a six-axis robot and the image pickup apparatus 120 is attached to a fifth link L5. Neither the configuration of the robot 110 nor the fixing position of the image pickup apparatus 120 is limited to this example. FIG. 7A is a view showing the entire model of the robot 110 and the image pickup apparatus 120. FIG. 7B is a view showing coordinate systems in the model. A robot coordinate system 601 is a coordinate system of the robot 110. Moreover, a robot-hand coordinate system 602 is a coordinate system of a robot hand. An image-pickup-apparatus coordinate system 603 is a coordinate system of the image pickup apparatus 120.

When parameters of links L0 through L6 and joints J1 through J6 of the robot 110 are known, a simultaneous transformation matrix $_rH_n$ from the robot coordinate system 601 to the robot-hand coordinate system 602 can be found by a forward kinematic calculation. Similarly, when parameter of the links L0 through L5' and the joints J1 through J5 of the robot 110 are known, a simultaneous transformation matrix $_rH_{(c)}$ from the robot coordinate system 601 to the image-pickup-apparatus coordinate system 603 can be found by the forward kinematic calculation.

Figure 7D:
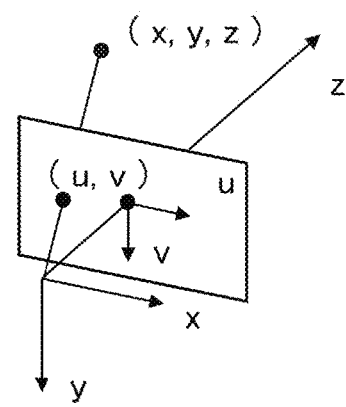

Moreover, an internal parameter $M_i$ showing correspondence between the coordinate (u, v) on the image pickup surface and the three-dimensional position (x, y, z) in the image-pickup-apparatus coordinate system 603 can be found by various calibration methods of the image pickup apparatus. FIG. 7C is a view showing a camera origin of the image pickup apparatus 120. FIG. 7D is a view showing the relation between the coordinate on the image pickup surface and the three-dimensional position in the image-pickup-apparatus coordinate system 603. The relation between the coordinate (u, v) on the image pickup surface and the three-dimensional position (x, y, z) in the image-pickup-apparatus coordinate system is shown by the following formula (1) using the internal parameter $M_i$.

$$\begin{bmatrix} u \\ v \\ s \end{bmatrix} = M_i \begin{bmatrix} x \\ y \\ z \\ 1 \end{bmatrix} \qquad \text{[Formula 1]}$$

The scale factor "s" shows the relation between a position on the image pickup surface and a pixel. Then, the relation between a position "p" in the robot coordinate system 601 and the projected position ($u_p$, $v_p$) of the position "p" on the image pickup surface is denoted by the following formula (2).

$$\begin{bmatrix} u_p \\ v_p \\ s \end{bmatrix} = M_{ir} H_c^{-1} \begin{bmatrix} p \\ 1 \end{bmatrix}$$ [Formula 2]

Figure 8:
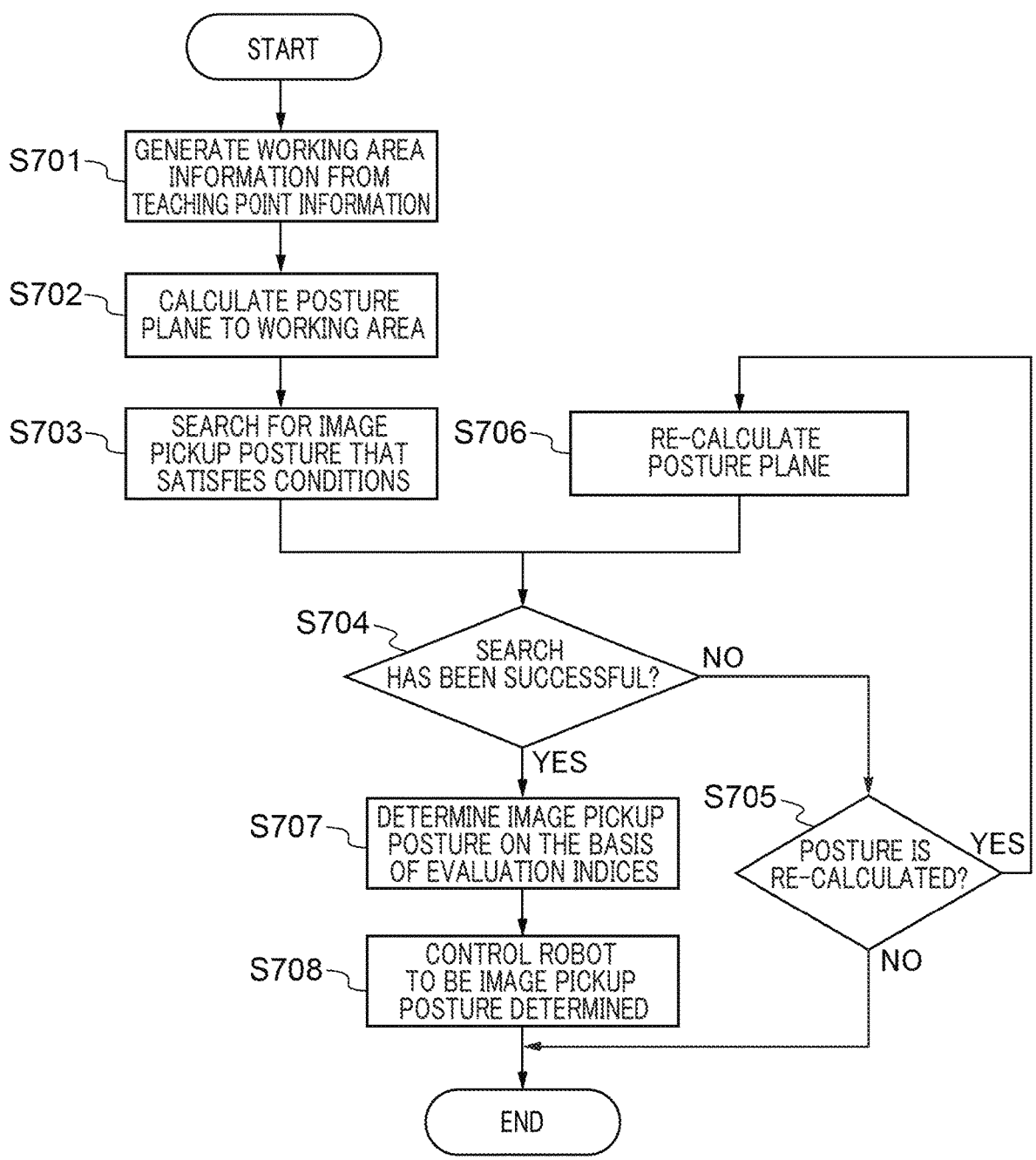
FIG. 8 is a flowchart showing detail of a flow of a process from specification of a working area to determination of an image pickup posture in the robot system concerning the first embodiment.

Next, the flow of the process from the specification of the working area 140 to the determination of the image pickup posture of the robot 110 will be described in detail. FIG. 8 is a flowchart showing the flow of the process from the specification of the working area to the determination of the image pickup posture in detail. The process of FIG. 8 starts after the execution button 403 is pressed in the state where the radio button 412 of "Set to image Pickup Posture" is selected.

However, a part of the process may be performed before the execution button 403 is pressed. For example, the process of S502 (process for specifying the working area) can be executed without pressing the execution button 403 if predetermined setting contents are set into the first interface 402. In this way, if the image processing apparatus 100 beforehand performs the process of S502 in background before the execution button 403 is pressed, the entire processing time can be reduced.

Figure 9A:
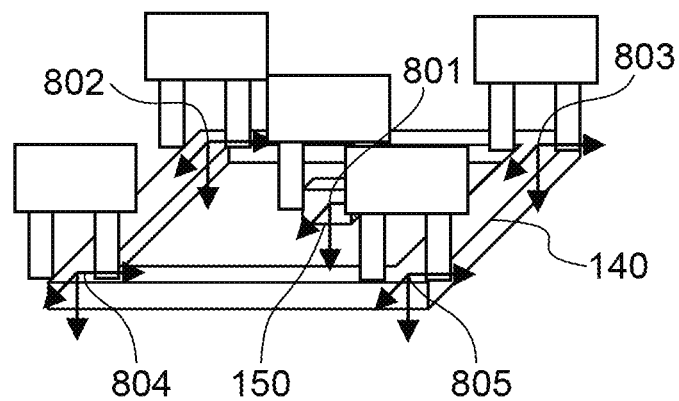
FIG. 9A and FIG. 9B are views showing an example of specification of the working area in the robot system concerning the first embodiment.
Figure 9B:
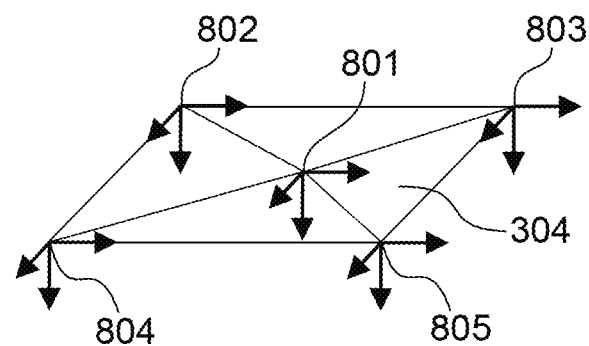

The working-area specification module 303 generates the working area information from the information about the teaching points associated with the serial numbers of the teaching points entered into the teaching point entry field 411 (S701). FIG. 9A and FIG. 9B are views showing a specific example of a working area. FIG. 9A is a view showing teaching points in the three-dimensional space. FIG. 9B is a view showing the teaching points in the model. In the example of FIG. 9A and FIG. 9B, the five teaching points 801 through 805 are designated.

The working-area specification module 303 generates a mesh face that connects the teaching points 801 through 805 by various meshing methods, such as the Derosne triangle division. The generated mesh face becomes the working area information. As mentioned above, a margin can be set to the margin setting field 413. When a positive value or a negative value is set to the margin setting field 413, the working-area specification module 303 expands or reduces the area shown by the working area information according to the set-up margin.

The execution button 403 shall be pressed in a state where two or less teaching points are entered into the teaching point entry field 411 and a positive value is set to the margin setting field 413. In this case, the working-area specification module 303 may generate the working area information by expanding the mesh face with the designated margin in a direction of a surface of which a normal line matches the tip direction of the robot 110 around a predetermined point or line.

The working-area specification module 303 may generate the working area information using approximation by a flat surface or a high order curved surface. Although the working area information is treated as surface information in the three-dimensional space in the following description, a group of the designated teaching points may be treated as the working area information in the original form of the group information about the positions and postures of the robot 110. Moreover, the working area information may be treated as depth information in the three-dimensional space generated from the designated teaching point group.

The robot control module 313 transmits the control amount of the robot 110 to the robot 110 on the basis of the position and posture of the workpiece 150 in the estimated working area 140 and the type of the workpiece. Then, the robot 110 works on the basis of the received control amount. The suitable image pickup posture of the robot 110 is defined so that the image pickup area 160 will include the entire working areas 140 and the resolution of the picked-up image will become high. The image-pickup-posture determination module 301 may extract a plurality of image pickup postures that satisfy such conditions. In this case, the image-pickup-posture determination module 301 may select the image pickup posture at which the image pickup area 160 includes the entire working area 140 and the resolution of the image becomes highest from among the plurality of extracted image pickup postures.

The formula (2) mentioned above clears up the projection relation of the working area to the picked-up image at the image pickup posture. Accordingly, the image-pickup-posture determination module 301 may find the image pickup posture by various estimation methods based on the Monte Carlo method etc. using the resolution of the working area projected to the picked-up image as an evaluation index.

Figure 10:
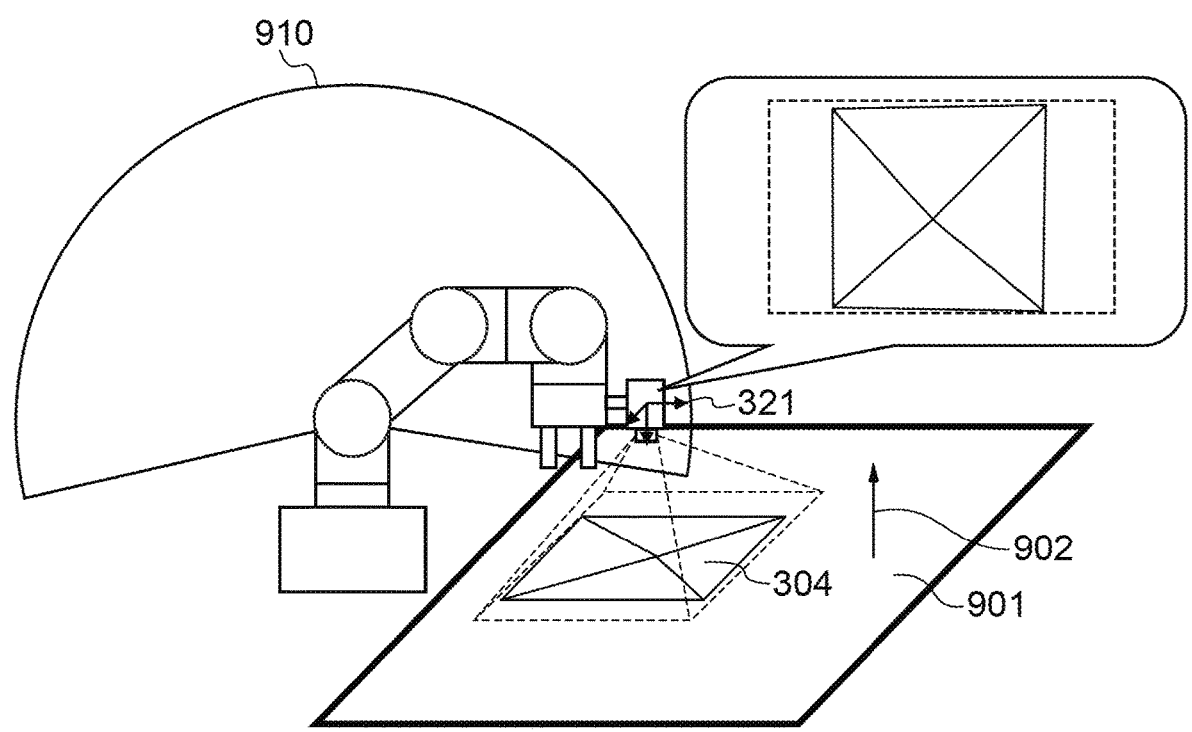
FIG. 10 is a view showing an example of an image pickup posture determination method in the robot system concerning the first embodiment.

Next, calculation of a posture plane will be described. The image-pickup-posture determination module 301 calculates the posture plane to the working area (S702). How to calculate the posture plane 901 to the working area 304 is described by referring to FIG. 10. FIG. 10 is a view showing an example of the determination method of the image pickup posture concerning this embodiment. The working area 304 of the example of FIG. 10 is a quadrangular pyramid that has a space in a height direction. The image-pickup-posture determination module 301 conditions a target posture of the image pickup unit 321 of the image pickup apparatus 120 so as to be in a confronting state to the posture plane 901. This facilitates estimation of the image pickup posture. In the "confronting state", a projection plane on the projection model of the image pickup unit 321 is parallel to the posture plane 901. For example, when the image pickup apparatus 120 is a stereoscopic camera that picks up images using a plurality of image pickup units 321, there area plurality of projection planes. In this case, the image-pickup-posture determination module 301 determines that the "confronting state" is achieved when an average of the projection planes is parallel to the posture plane 901.

In the first embodiment, the image-pickup-posture determination module 301 determines the posture plane 901 by approximating the posture plane 901 to the teaching point group, the surface information, or the depth information about the working area 304, using various approximation methods, such as a maximum likelihood method. The posture plane 901 corresponds to the plane approximated using the teaching points. In order to reduce influence due to errors in the teaching point information, the image-pickup-posture determination module 301 may approximate by weighting to teaching points that are positioned in an outer periphery or that have high flatness. Moreover, when the working area 304 is the surface information in the three-dimensional space, the image-pickup-posture determination module 301 may determine the posture plane 901 by applying various approximation methods, such as the maximum likelihood method, as continuous amounts. In the meantime, when determining the posture plane 901, the image-pickup-posture determination module 301 may use discretization, or may use a least squares method by assuming that error variance accords to the Gaussian distribution. This improves the processing speed.

In this way, the image-pickup-posture determination module 301 determines the suitable image pickup posture at high speed by designating conditions as shown in FIG. 10 without estimating the image pickup posture directly from the image pickup area 160. In this embodiment, the image pickup posture is determined by an arbitrary calculation method on the basis of the working area information showing the working area 140 and the image pickup area information showing the image pickup area 160.

Next, the image-pickup-posture determination module 301 searches for the image pickup posture that satisfies the conditions (S703). The image-pickup-posture determination module 301 searches a robot movable range 910 for the image pickup posture that is in the confronting state to the posture plane 901 and where the view field includes the entire working area 304. The robot movable range 910 is a movable range of the robot 110 and is determined by applying a well-known kinematic method to the robot parameter information.

The image-pickup-posture determination module 301 uses the conditioning with the posture plane 901 and the projection of the working area 304 to the picked-up image that is found using the formula (2) as the evaluation indices. This enables a high-speed search as compared with a search without conditioning. The image-pickup-posture determination module 301 may limit a search range using the positional relationship between the center position of the working area 304 and the robot movable range 910. Limitation of the search range improves the efficiency of the process of the image-pickup-posture determination module 301.

The image-pickup-posture determination module 301 determines whether the search of S703 has been successful (S704). When the search of S703 has not been successful (No in S704), the image-pickup-posture determination module 301 determines whether the first check box 414 in FIG. 5 (the check box that designates whether a tilt of the image pickup posture is allowed when re-calculating the image pickup posture) is checked. Namely, the image-pickup-posture determination module 301 determines whether the posture is re-calculated (S705). When the determination result in S705 is No, the information showing that the search failed is displayed on the image pick-up posture determination screen 400. Then, the process is finished.

In the meantime, when the determination result in S705 is Yes, the image-pickup-posture determination module 301 re-calculates the image pickup posture (S706). Namely, the image-pickup-posture determination module 301 searches for the posture plane 901 again. At this time, the image-pickup-posture determination module 301 may limit a search range using the positional relationship between the center position of the working area 304 and the robot movable range 910. For example, the image-pickup-posture determination module 301 may assume the posture of the robot 110 that the normal line 902 of the posture plane 901 tilts toward the robot movable range 910 when viewed from the center position of the working area 304. Then, the image-pickup-posture determination module 301 searches the robot movable range 910 in the direction that is easy to satisfy the conditions while limiting the search condition by re-calculating a posture in a state where the posture plane 901 tilts. For example, even if a posture that satisfies the conditions of S703 cannot be found in a state where the posture plane 901 does not tilt, the posture that satisfies the conditions of S703 may be found in the state where the posture plane 901 tilts. Accordingly, the search for the image pickup posture that satisfies the conditions of S703 becomes efficient by tilting the posture plane 901.

When the search is successful (Yes in S704), the image-pickup-posture determination module 301 determines the image pickup posture on the basis of the evaluation indices (S707). The evaluation indices can be arbitrarily set up according to image pickup conditions. For example, the image-pickup-posture determination module 301 selects an image pickup posture that the resolution of the picked-up image is the highest from among the plurality of image pickup postures retrieved in S703 or S706. The image-pickup-posture determination module 301 may select an image pickup posture that the resolution is more than a predetermined level and the projected area of the working area information to the picked-up image is larger than a predetermined area from among the plurality of image pickup postures retrieved. The image-pickup-posture determination module 301 may determine an image pickup posture on the basis of the distance between the center position of the working area 304 and the center of the picked-up image. The image-pickup-posture determination module 301 may determine an image pickup posture by combining various evaluation indices, such as a period (transit time) needed to move the tip of the arm of the robot 110 to the working area 304 from a predetermined image pickup posture and a manipulability measure of the robot 110.

The image-pickup-posture determination module 301 may determine an image pickup posture on the basis of an evaluation index by re-searching the robot movable range 910 near the retrieved image pickup posture. Moreover, the image-pickup-posture determination module 301 may determine an image pickup posture by performing a recursive search. At this time, various kinds of algorithms are applicable to a maximization problem that maximizes the evaluation index. As mentioned above, the image processing apparatus 100 performs the image process, and a time period in which the robot 110 actually operates the workpiece 150 is shortened. Moreover, an operation of the robot 110 near an abnormal posture is avoidable.

The information that shows the image pickup posture determined in S707 is the image pick-up posture information. The image processing apparatus 100 transmits the image pick-up posture information as a control amount to the robot 110. The robot control module 313 operates the robot 110 so as to be in the determined image pickup posture by controlling the drive module 315 (S708). The robot 110 works when the execution button 403 in the image pick-up posture determination screen 400 of FIG. 5 is pressed. However, when the radio button 412 of "Register as Teaching Point" is selected, the teaching point is registered without working the robot 110. Accordingly, this process is finished. The process of this embodiment does not necessarily include the processes of S701 through S708 in FIG. 8. The image pickup posture of the robot 110 may be determined by an arbitrary method using the working area information, the image pickup area information, etc.

As mentioned above, when the teaching points are designated, the image processing apparatus 100 specifies the working area on the basis of the designated teaching points, and specifies the image pickup area including the working area using the various kinds of information stored beforehand. Then, the image processing apparatus 100 determines the image pickup posture of the robot 110 from the specified image pickup area. Thereby, since the suitable image pickup posture of the robot 110 is determined automatically without repeating check and adjustment, the operation for determining the image pickup posture is simplified.

Although the above first embodiment describes the example that specifies one working area and one image pickup area, a plurality of working areas or image pickup postures may be specified. For example, the robot 110 may perform an operation to hold the workpiece 150 placed in a first working area A and to put the workpiece 150 into a box placed in a second working area B that is different from the first working area A. In this case, the image-pickup-posture determination module 301 determines a first image pick-up posture C in the first working area A in which the workpiece 150 is held. Similarly, the image-pickup-posture determination module 301 determines a second image pick-up posture D in the second working area B in which the workpiece 150 is put. Then, the image-pickup-posture determination module 301 stores the information about the first working area A with the information about the first image pick-up posture C in the storage unit 202 in association with each other. Similarly, the image-pickup-posture determination module 301 stores the information about the second working area B with the information about the second image pick-up posture D in the storage unit 202 in association with each other. These pieces of information are stored by a table format etc. Accordingly, this embodiment is applicable even to a case where one robot 110 works in different working areas.

Next, a second embodiment of the present invention will be described. An element that is identical to that of the first embodiment is indicated by the same reference numeral and its description is omitted. A configuration of the robot system 10 of the second embodiment is identical to the configuration of the first embodiment shown in FIG. 1.

A correction parameter for converting a position and posture in a picked-up image into a position and posture in a robot coordinate is determined in the second embodiment. The correction parameter is used in order to correct control of the robot 110. Hereinafter, a determination method for the correction parameter will be described.

Figure 11A:
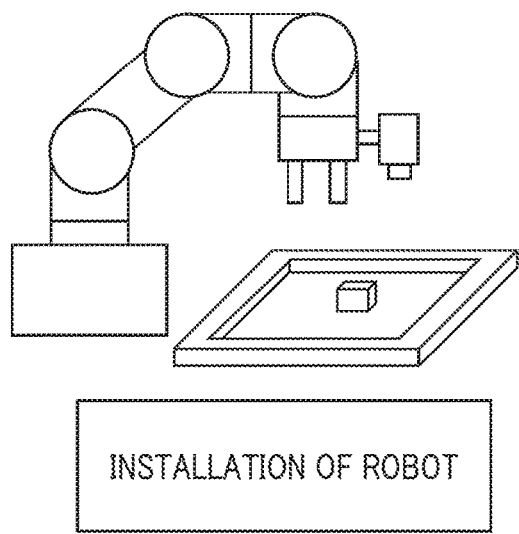
FIG. 11A through FIG. 11D are views showing a flow until determination of an image pickup posture in a robot system concerning a second embodiment of the present invention.

FIG. 11A through FIG. 11D are views showing a flow until determining an image pickup posture. A user installs the robot 110 at a desired position so that the robot 110 can operate the workpiece 150 within the working area 140. That is, the user installs the robot 110 at the position where the working area 140 is estimated to be a movable area of the robot 110 (FIG. 11A).

Figure 11B:
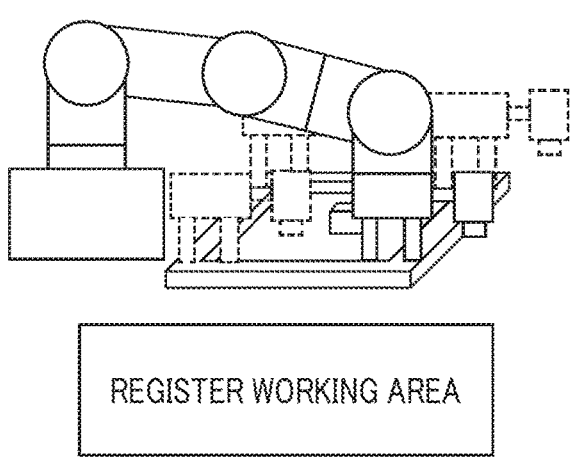
Figure 11C:
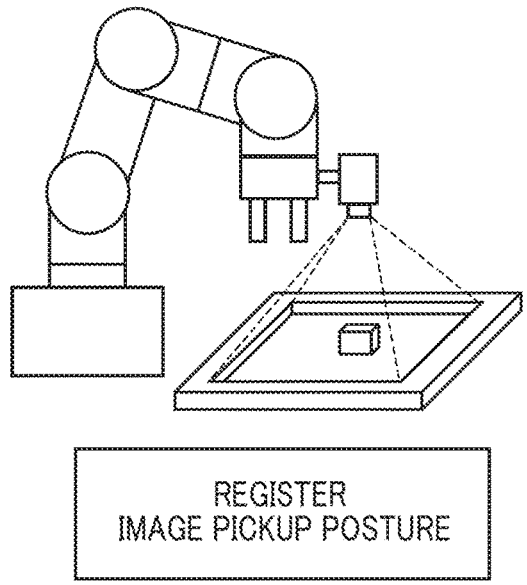
Figure 11D:
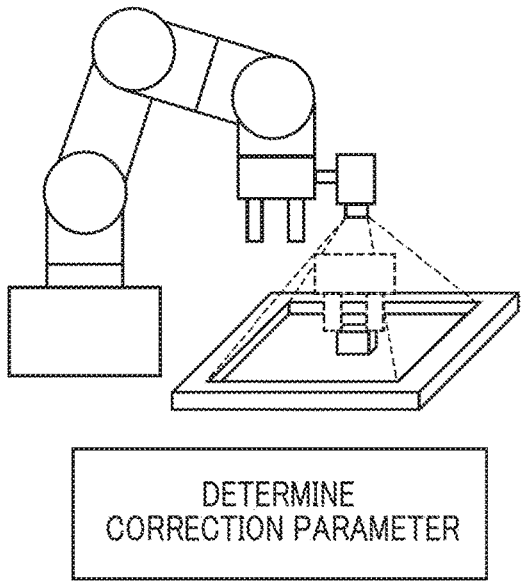

After installation of the robot 110, the user checks whether the robot 110 can work within the working area (robot working area) 140. At this time, the user checks by operating the robot 110 (FIG. 11B). For example, the user moves the arm to four corners of the working area 140 in order and checks whether the arm takes an operatable posture at each of the corners. Then, the image processing apparatus 100 specifies the image pickup posture that the working area 140 is included in the image pickup area 160, and registers the specified image pickup posture (FIG. 11C). After that, the image processing apparatus 100 determines the correction parameter for converting the position and posture in the picked-up image into the position and posture in the robot coordinate on the basis of working area information and image pickup area information (FIG. 11D) in response to a user's operation.

The user can register the points to which the arm of the robot 110 is moved (the four corners of the working area 140, for example) in the operation shown in FIG. 11B as teaching points. The image processing apparatus 100 specifies the working area information that shows the working area from these teaching points. Furthermore, the image processing apparatus 100 specifies the image pickup area 160 from the image pickup posture registered in FIG. 11C. The information that shows the image pickup area 160 is the image pickup area information mentioned above. The image processing apparatus 100 determines the correction parameter for converting the position and posture in the picked-up image into the position and posture in the robot coordinate on the basis of the image pickup area information and working area information that are specified.

That is, the image processing apparatus 100 determines the conversion parameter from an image coordinate to the robot coordinate by calculating how the area of the working area information is projected to the picked-up image. This is based on the thinking that the workpiece 150 is located in the working area. Accordingly, the image processing apparatus 100 is able to determine the correction parameter for converting the position and posture in the picked-up image into the position and posture in the robot coordinate without requiring an optical marker.

The hardware configurations of the image processing apparatus 100, robot 110, and image pickup apparatus 120 of the second embodiment are identical to the hardware configurations of the first embodiment shown in FIG. 3.

Figure 12:
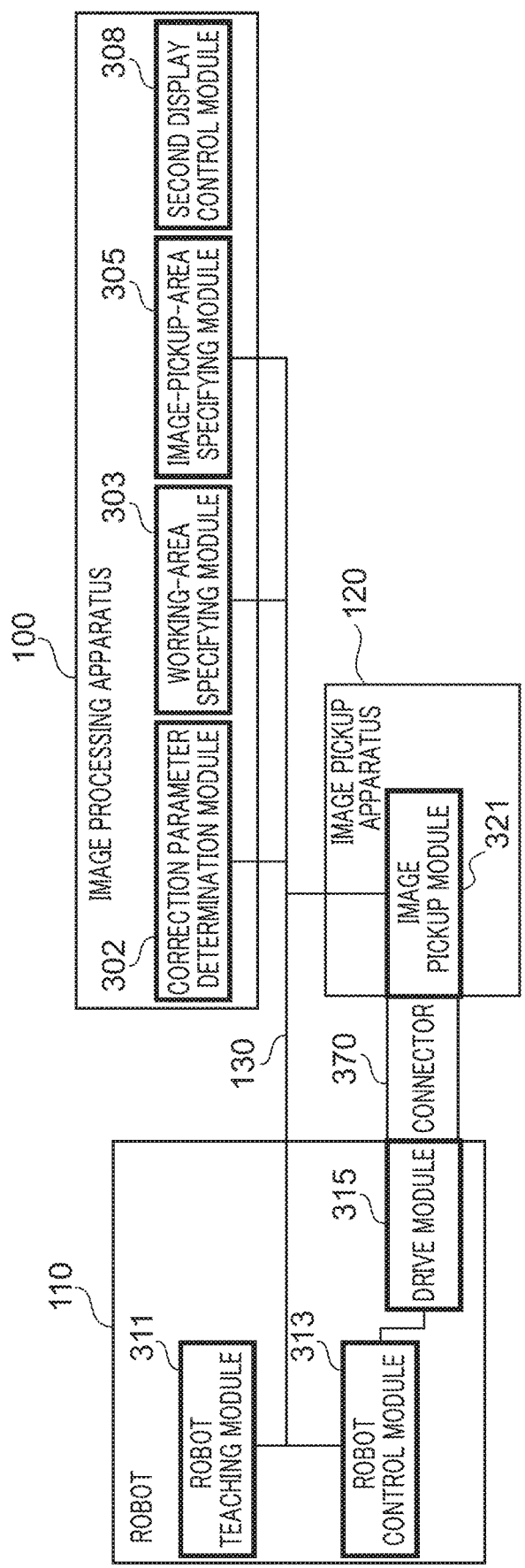
FIG. 12 is a block diagram showing functions of an image processing apparatus, a robot, and an image pickup apparatus in the robot system concerning the second embodiment.

Next, functions of the image processing apparatus 100, robot 110, and image pickup apparatus 120 will be described. FIG. 12 is a block diagram showing the functions of the image processing apparatus 100, robot 110, and image pickup apparatus 120. In the second embodiment, the image processing apparatus 100 is provided with a correction parameter determination module 302 and a second display control module 308 in place of the image-pickup-posture determination module 301 and the first display control module 307 in the first embodiment, respectively. The other configurations are identical to the configurations of the first embodiment.

The storage unit 202 of the image processing apparatus 100 stores various kinds of information used for estimating a relation between a point in the three dimensional space in the visual field and a position in the picked-up image to which the point is projected when an image pickup unit 321 of the image pickup apparatus 120 picks up the image. The relation between a position in the three-dimensional space picked up by the image pickup unit 321 and a position in the picked-up image is expressed by an internal parameter and an external parameter determined by the position and posture of the image pickup unit 321. Moreover, the internal parameter may vary according to variations of optical properties, such as a field angle, of the optical instrument 225 of the image pickup apparatus 120. The storage unit 202 may store the above-mentioned various kinds of information as tables corresponding to the respective optical properties or may store the information as values using the optical properties as coefficients.

Next, the correction parameter determination module 302 will be described. The correction parameter determination module 302 corresponds to a second determination means. The correction parameter determination module 302 determines the correction parameter for converting the position and posture in the picked-up image into the position and posture in the robot coordinate on the basis of the image pickup area information and working area information that are specified. In this embodiment, the correction parameter determination module 302 finds a relation that defines an area to which the working area 140 is projected in the image with respect to the posture of the robot 110 on the basis of the working area information, the robot parameter information, and the image pickup area information. Thereby, the correction parameter determination module 302 specifies the working area corresponding to the image coordinate and determines the correction parameter. A determination method for the correction parameter will be described later.

Figure 13:
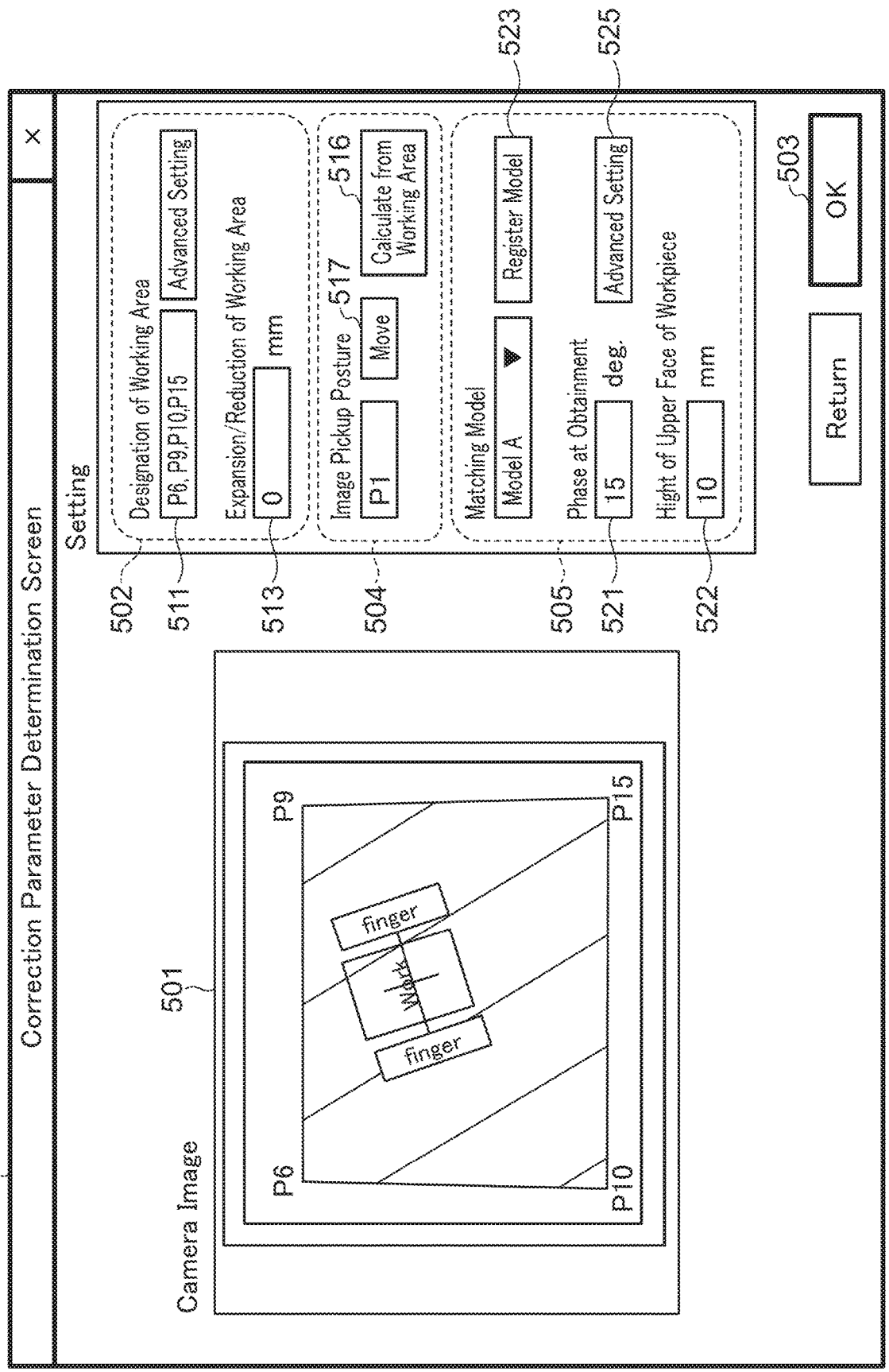
FIG. 13 is a view showing an example of a correction parameter determination screen in the robot system concerning the second embodiment.

The correction parameter determination module 302 may determine the correction parameter that satisfies conditions entered into a GUI in which a restriction condition and a solution of an arbitrary effector attached at the tip of the arm of the robot 110 are selectable. FIG. 13 is a view showing an example of an operation screen (a correction parameter determination screen 500) of the above-mentioned GUI. The second display control module 308 performs display control of the screen displayed on the display unit 203. The second display control module 307 corresponds to a second display control means. A user is able to input and select various values by operating the input unit 204 in the state where the correction parameter determination screen 500 is displayed on the display unit 203. The correction parameter determination screen 500 includes an image display area 501, an area setting interface 502, an execution button 503, an image-pickup-posture setting interface 504, and a correction condition setting interface 505. In the correction parameter determination screen 500, the area setting interface 502, the image-pickup-posture setting interface 504, and the correction condition setting interface 505 are provided as setting items.

The screen example of the correction parameter determination screen 500 is not limited to the example of FIG. 13. The picked-up image that the image pickup unit 321 of the image pickup apparatus 120 is picking up is displayed on the image display area 501. In the example of FIG. 13, the picked-up image is indicated as a camera image. The area setting interface 502 is an interface for specifying the working area 140. The area setting interface 502 includes a teaching point entry field 511 and a margin setting field 513.

The teaching point entry field 511 is a box to which teaching points for generating the working area information are entered. Although the teaching point entry field 511 shows the example of the box in the example of FIG. 13, the teaching point entry field 511 is not limited to the box. The storage unit 212 of the robot 110 stores information about a plurality of teaching points. In this embodiment, the storage unit 212 stores the information about the plurality of teaching points to which serial numbers are respectively associated. When the serial numbers of the teaching points are entered into the teaching point entry field 511, the working-area specification module 303 specifies the working area 140. In the example of FIG. 13, the area constituted by the information about the teaching points corresponding to the serial numbers "P6", "P9", "P10", and "P15" becomes an area indicated by the working area information. A teaching point may be specified by a serial number input to the teaching point entry field 511, or may be specified by selection from a list form dialog. Serial numbers of teaching points can be input to the teaching point entry field 511 using a comma or a hyphen. When the serial numbers are input with a hyphen, the serial numbers of the teaching points can be designated collectively.

The margin setting field 513 is provided in order to input the margin of the working area 140 to the image pickup area 160. An initial value of the margin is set to "0". When the margin is "0", the area shown by the working area information that is found from the teaching points input into the teaching point entry field 511 becomes the image pickup area 160. A positive value or a negative value can be input into the margin setting field 513. When a positive value is input into the margin setting field 513, the area shown by the working area information that is found from the teaching points is expanded. In the meantime, when a negative value is input into the margin setting field 513, the area shown by the working area information that is found from the teaching points is reduced.

The working area 140 is specified on the basis of the teaching points. For example, when the workpiece 150 that is a working target of the robot 110 is mounted on a mounting base (for example, a tray) as shown in FIG. 1, an edge 140A of the tray does not become the working area of the robot 110 approximately. At this time, when teaching points are designated at the edge 140A of the tray (when the user moves the tip of the arm of the robot to the positions on the edge of the tray in FIG. 11B), the working area specified by the teaching points is wider than the actual working area 140. Accordingly, the input to reduce the image pickup area information is permitted to the margin setting field 513 in the correction parameter determination screen 500. This enables to match the working area information that is stored in the image processing apparatus 100 and the actual working area 140, easily.

The working-area specification module 303 may generate working area information whenever the input to the area setting interface 502 is updated. In this case, the second display control module 308 may perform control that superimposes at least one of the working area information and the teaching points used to generate the working area information on the camera image in the image display area 501 whenever the input to the area setting interface 502 is updated. Thereby, since the setting contents to the area setting interface 502 are graphically notified to the user, setting errors decrease and working efficiency improves.

The execution button 503 is a second button for executing a process for determining the correction parameter. As mentioned above, various setting contents for specifying the working area 140 are set in the area setting interface 502. When the image processing apparatus 100 receives a press operation of the execution button 503, the correction parameter determination module 302 determines the correction parameter on the basis of the working area information and the image pickup area information.

The image-pickup-posture setting interface 504 is an interface used for registration of an image pickup posture. The image-pickup-posture setting interface 504 has a calculation button 516 and a move button 517. In the image-pickup-posture setting interface 504, a serial number of a teaching point is designatable with a text box, for example. In the example of FIG. 13, the serial number of the teaching point is designated as "P1". The calculation button 516 is used for registering the image pickup posture calculated on the basis of the image pickup area information to the selected teaching point. When the calculation button 516 is pressed, the calculation unit 201 calculates the image pickup position and posture where the image pickup area information is included in the image pickup area and the resolution is maximized, and registers them into the teaching point "P1". It should be noted that the image pickup posture may be manually set up. The move button 517 is used for moving the tip of the arm of the robot 110 to the designated teaching point ("P1" in FIG. 13).

The correction condition setting interface 505 is an interface for setting up conditions used for finding the correction parameter. The correction condition setting interface 505 includes a phase entry field 521, height entry field 522, model registration button 523, and advanced setting button 524. In the correction condition setting interface 505, the posture of the robot 110 at the time of obtaining the workpiece 150 (at the timing of catching the workpiece 150, for example) can be set up with respect to the matching result of the working area 304 and the workpiece 150, for example.

The phase entry field 521 is provided in order to enter a phase at the time of obtaining the workpiece 150 to the matching result. The calculation unit 201 can set up the posture of the robot 110 from the phase entered into the phase entry field 421. For example, even when an effector (for example, a two-finger hand etc.) that the posture of the tip of the robot 110 is important is attached to the tip of the robot 110 at the time of obtaining the workpiece 150, a suitable correction is performed by setting the phase.

The height entry field 522 is provided in order to find a difference between the top surface of the workpiece 150 and the coordinate position of the tip of the robot 110. The height of the top surface of the workpiece 150 shall be entered into the height entry field 522. The calculation unit 201 calculates the difference between the coordinate position of the tip of the robot 110 and the height of the top surface of the workpiece 150 entered into the height entry field 522. The correction parameter determination module 302 can determine the correction parameter in consideration of a projection error due to the height difference on the basis of the calculated height difference. The above-mentioned height difference may be directly entered into the height entry field 522. In this case, the correction parameter determination module 302 determines the correction parameter in consideration of the entered height difference. The model registration button 523 is used for registering the matching model set up with the correction condition setting interface 505. A plurality of matching models shall be registered in this embodiment. FIG. 13 shows the example in which a "Model A" is set as the matching model. When another model is set up, a target model may be selected from a pull-down menu. An advanced setting button 525 is used for setting the correction condition in detail.

Since the correction parameter determination screen 500 displays the image display area 501, area setting interface 502, execution button 503, and second interface 504 collectively, the number of times of screen transition can be reduced. As mentioned above, the picked-up image that the image pickup apparatus 120 is picking up is displayed in the image display area 501. The image processing apparatus 100 may display the area shown by the working area information in an arbitrary state by superimposing on the camera image currently displayed in the image display area 501. In this embodiment, the area shown by the working area information will be displayed so as to be mostly superimposed on the working area 140. The image including the workpiece and the two-finger hand is displayed in the image display area 501 in FIG. 13.

Moreover, the second display control module 308 may display the teaching point information showing the teaching points in an arbitrary state by superimposing on the camera image currently displayed in the image display area 501. Thereby, the user can quickly recognize a setting error of the working area information or teaching point information and a situation where the working area 140 on the camera image is not in a desired state. Moreover, the second display control module 308 may display a hypothetical hand (tip) and matching model of which postures are designated by the correction condition setting interface 505 in arbitrary states so as to superimpose on the camera image currently displayed in the image display area 501. For example, in the example of FIG. 13, the hypothetical two-finger hand based on the correction parameter determined by the contents set in the correction parameter determination screen 500 is displayed so as to be superimposed. Thereby, the user can quickly check whether the user's setting contents match intended setting contents.

Figure 14:
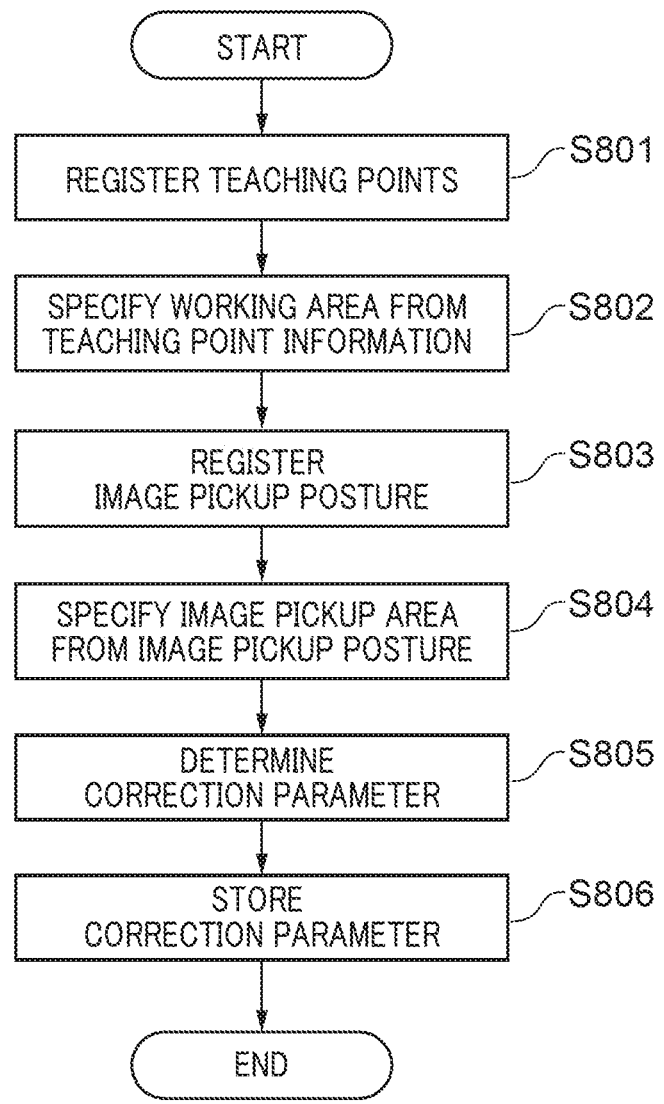
FIG. 14 is a flowchart showing a flow of a process for determining the correction parameter in the robot system concerning the second embodiment.

Next, a process about the determination of the correction parameter in this embodiment will be described. FIG. 14 is a flowchart showing a flow of the process about the determination of the correction parameter. The user operates the robot 110 to be at the position and posture of the teaching point to register, and performs the operation of registering the teaching point. When receiving the operation, the robot teaching module 311 stores the teaching point information to the storage unit 212. Thereby, the teaching point is registered (S801).

Next, when the user operates the input unit 204 of the image processing apparatus 100 to display the correction parameter determination screen 500, the second display control module 308 displays the correction parameter determination screen 500 on the display unit 203. The user performs operation of designating the working area 140 to the area setting interface 502. At this time, the user at least performs the operation of entering a teaching point into the teaching point entry field 511. Moreover, the user can also perform a designating operation to the margin setting field 513 etc. When the teaching point registration function is provided in the area setting interface 502 of the correction parameter determination screen 500, the user can also designate a teaching point directly. In this case, the process of S801 and a process of S802 can be performed collectively.

The process in FIG. 14 is started after the execution button 503 is pressed. However, a part of the process may be performed before the execution button 503 is pressed. For example, the process of S802 (process for specifying the working area) can be executed without pressing the execution button 503 if predetermined setting contents are set into the area setting interface 502. In this way, if the image processing apparatus 100 beforehand performs the process of S802 in background before pressing the execution button 403, the entire processing time can be reduced.

When the teaching points are entered to the area setting interface 502, the working-area specification module 303 specifies the working area from the teaching point information based on the entered teaching points (S802). When the working area 140 is correctly designated in S801, the working area specified in S802 matches the working area 140. Then, the working area information corresponding to the specified working area is generated. The working area information is denoted by the coordinate system in the actual three-dimensional space.

Next, when the calculation button 516 of the image-pickup-posture setting interface 504 is pressed, the calculation unit 201 calculates the image pickup position and posture where the image pickup area information is included in the image pickup area and the resolution is maximized as the image pickup posture, and registers the calculated image pickup posture (S803). When the image pickup posture is registered in S803, the image-pickup-area specification module 305 specifies image pickup area information from the image pickup posture using the various kinds of information (the internal parameter etc.) mentioned above (S804).

Then, the correction parameter determination module 302 determines the correction parameter on the basis of the working area information and the image pickup area information that are specified (S805). When receiving a users presses operation to the execution button 403, the calculation unit 201 stores the correction parameter that is associated with the working area information and image pickup area information that are specified in the storage unit 202 (S806).

Details of the processes of S802 through S805 will be described below. As mentioned above, when the move button 517 is pressed, the robot 110 moves the tip of the arm to the determined image pickup posture. The picked-up image that the image pickup apparatus 120 is picking up is displayed in the image display area 501. The user is able to check whether the determined image pickup posture of the robot 110 is an image pickup posture that the user desires by checking the picked-up image. When the image-pickup-posture setting interface 504 is operated before the area setting interface 502 is operated, the processes of S803 and S804 may be performed prior to the processes of S801 and S802.

A model of the robot 110 and image pickup apparatus 120 of the second embodiment is common with the model described by referring to FIG. 7A through FIG. 7D in the first embodiment.

Figure 15:
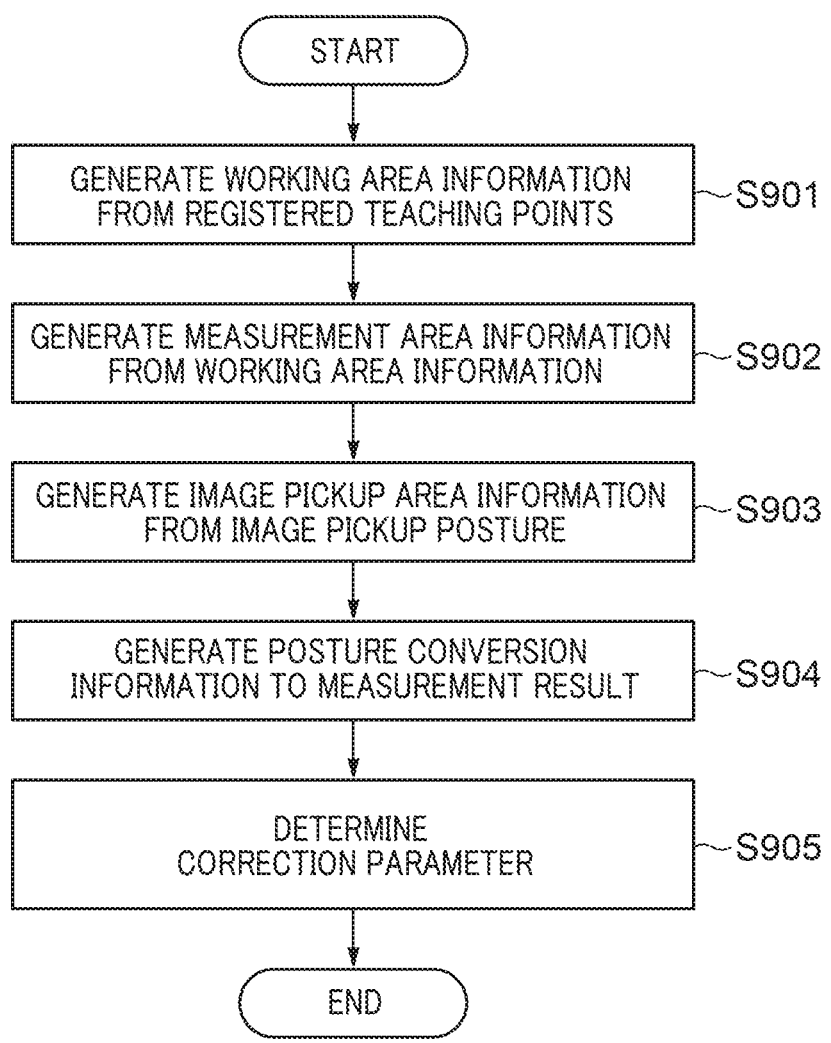
FIG. 15 is a flowchart showing detail of a flow of a process performed until determining the correction parameter in the robot system concerning the second embodiment.

Next, a flow from the process that specifies the working area 140 to the process that determines the correction parameter for converting the position and posture in the image into the position and posture in the robot coordinate will be described. FIG. 15 is a flowchart showing the flow of the process about the determination of the correction parameter. The process in FIG. 15 is started after the execution button 503 is pressed. Moreover, each process in FIG. 15 may be executed in response to an operation (change of a value, etc.) to the area setting interface 502, the image-pickup-posture setting interface 504, or the correction condition setting interface 505 as a trigger.

The working-area specification module 303 generates the working area information from the information about the teaching points associated with the serial numbers of the teaching points entered into the teaching point entry field 511 (S901). This process is identical to the process of S701 in FIG. 8 described in the first embodiment.

The operation to the area setting interface 502 shall be stopped in a state where two or less teaching points are entered into the teaching point entry field 511 and a positive value is set to the margin setting field 513. For example, in the above-mentioned state, the input unit 204 shall be a mouse and a cursor (focus) shall be moved away from the area setting interface 502 in response to a mouse operation. In such a case, the working-area specification module 303 may generate the working area information by the method described in the first embodiment.

Figure 16A:
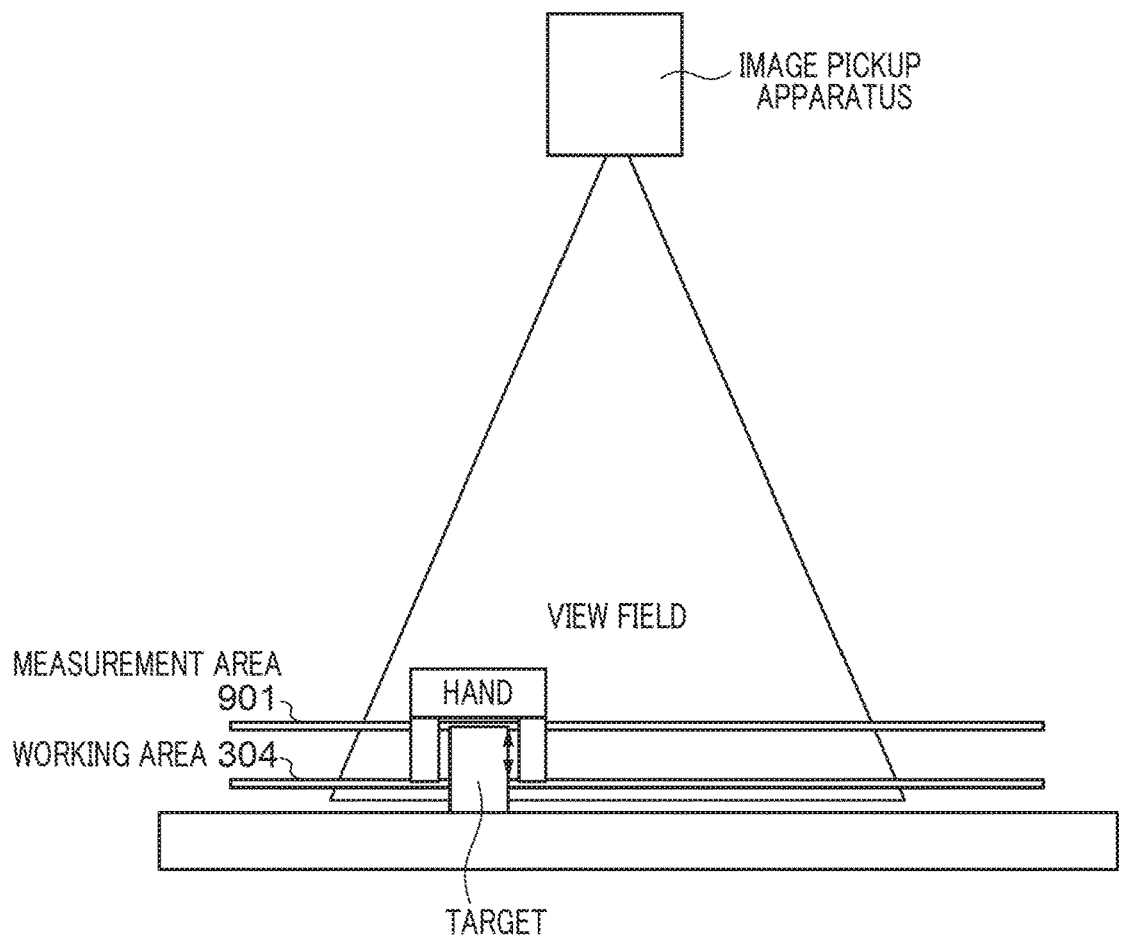
FIG. 16A and FIG. 16B are views showing generation of measurement range information in the robot system concerning the second embodiment.
Figure 16B:
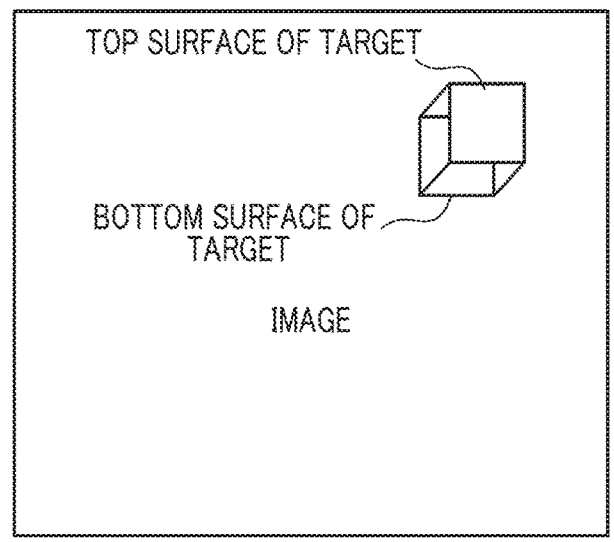

Next, the correction parameter determination module 302 generates a measurement area 901 corresponding to the working area 304 as shown in FIG. 16A (S902). FIG. 16A and FIG. 16B are views for describing generation of measuring area information that shows the measuring area 901. In the example of FIG. 16A, when matching of the working area 304 and workpiece 150 is performed, the difference has occurred between the working area 304 and the top surface of the workpiece (target) 150. The correction parameter determination module 302 calculates the measurement area 901 to the teaching point group, the surface information, and the depth information in the working area 304 by shifting the working area 304 by the height difference in the height direction. That is, the measurement area 901 is calculated in consideration of the height of the workpiece 150 with respect to the working area 304. The height difference between the working area 304 and the measurement area 901 is calculable on the basis of the value of the height of the workpiece 150 entered into the height entry field 522 as mentioned above. It should be noted that the workpiece 150 is indicated as a "TARGET" and the effector attached to the tip of the robot 110 is indicated as a "HAND" in FIG. 16A.

The correction parameter determination module 302 may calculate the measurement area 901 by shifting the working area 304 in a normal line direction when the working area 304 is a surface information in the three-dimensional space. Moreover, the correction parameter determination module 302 may calculate the measurement area 901 by shifting the teaching point group used when generating the working area 304 in the direction toward the tip of the robot 110 and then using a method similar to the method for specifying the working area 304. Since measurement area information showing the measurement area 901 is generated on the basis of the working area information, the correlation of both pieces of the information is easily calculable. Moreover, when an adsorption hand attached to the tip of the robot 110 adsorbs a thin workpiece, such as cloth or paper, the working area 304 and the measurement area 901 are approximately identical. In such a case, the working area 304 and the measurement area 901 may be treated as the same area. The second display control module 308 may display the measurement area 901 so as to superimpose on the camera image displayed in the image display area 501. The measurement area 901 is shown as the "TOP SURFACE OF TARGET" in the example of FIG. 16B.

As shown in FIG. 15, the correction parameter determination module 302 generates image pickup area information from the image pickup posture (S903). The correction parameter determination module 302 specifies the image pickup area information on the basis of the various kinds of information (the internal parameter etc.) and the image pickup posture (the external parameter etc. that can be found by the forward kinematic method from the robot parameter information) that are mentioned above. The above-mentioned formula (2) clarifies the projection relations of the measurement area information, working area information, and teaching points to the picked-up image. Then, the correction parameter determination module 302 generates posture conversion information (S904). As mentioned above, the correction condition setting interface 505 includes the phase entry field 521. The correction parameter determination module 302 generates the posture conversion information that converts the measuring result on the image into the posture in the robot coordinate on the basis of the posture of the robot 110 at the time of obtaining the workpiece 150 to the matching result entered into the phase entry field 521.

For example, a case where an effector like a two-finger hand is attached to the tip of the robot 110 and the posture of the workpiece 150 has a predetermined phase is estimated. In this case, when the two-finger hand of the robot 110 holds the workpiece 150 from directly above, the posture of the workpiece 150 in the image is converted into a rotational posture in the hand-tip direction of the robot 110 in the working area information. Thereby, the two-finger hand of the robot 110 can hold the workpiece 150 in the predetermined phase. When an effector like an adsorption hand is attached to the tip of the robot 110, it is not necessary to take a phase into consideration. In such a case, since the process of S904 and the process that specifies the posture can be omitted, the processing speed becomes high.

The correction parameter determination module 302 generates the working area information in S901, generates the measurement area information in S902, generates the image pickup area information in S903, and generates the posture conversion information with respect to the measurement result in S904. Then, the correction parameter determination module 302 determines the correction parameter for converting the position and posture in the picked-up image into the position and posture in the robot coordinate on the basis of the various kinds of information generated (S907). In this embodiment, the correction parameter determination module 302 calculates the transformation matrix that transfers a coordinate from the image to the measurement area information using the above-mentioned formula (2) on the basis of the image pickup area information and measurement area information that are generated. Then, the correction parameter determination module 302 calculates the transformation matrix that transfers a coordinate from the measurement area information to the working area information, and combines the calculated transformation matrix with the above-mentioned transformation matrix that transfers a coordinate from the image to the measurement area information. Thereby, the correction parameter determination module 302 can determine the correction parameter which converts the position and posture in a picked-up image into the position and posture in robot coordinates.

Furthermore, the correction parameter determination module 302 may give a posture constraint in the hand-tip direction of the robot 110 to the working area information according to the combination result of the above-mentioned transformation matrices. For example, the posture of the robot 110 may be restricted depending on the positional relationship between the robot 110 and the working area 304. In such a case, the correction parameter determination module 302 may determine the correction parameter in consideration of restrictions of the posture of the robot 110 on the basis of the positional relationship of the robot 110 and the working area 304. Then, the correction parameter determination module 302 may give redundancy to the posture of the robot 110 depending on the method of giving the posture constraint. Moreover, the correction parameter determination module 302 may determine the correction parameter uniquely on the basis of restrictions of the posture conversion information to the measurement result.

Furthermore, the correction parameter determination module 302 may determine the correction parameter uniquely on the basis of at least one of the operation time of the robot 110 and the operationability of the robot 110. The operation time (for example, a period during which the arm moves) of the robot 110 becomes a factor for determining the correction parameter. Moreover, the operationability of the robot 110 also becomes a factor for determining the correction parameter. Accordingly, the correction parameter determination module 302 may determine the correction parameter on the basis of the operating time and the operationability of the robot 110.

As mentioned above, when the teaching points are designated, the image processing apparatus 100 specifies the working area on the basis of the designated teaching points, and specifies the image pickup area using the various kinds of information stored beforehand and the designated image pickup posture. The image processing apparatus 100 determines the correction parameter for converting the position and posture in the picked-up image into the position and posture in the robot coordinate on the basis of the image pickup area and working area that are specified. Thereby, the image processing apparatus 100 is able to convert the coordinate of the picked-up image into the coordinate of the robot automatically without requiring creation of an optical marker and without requiring calibration using the optical marker. Accordingly, the operation that determines the correction parameter for converting the coordinate of the picked-up image into the coordinate of the robot is simplified, and the control of the robot 110 is corrected.

Moreover, since this embodiment does not require an optical marker, there are no restrictions (for example, a restriction that keep the image pickup apparatus 120 to be perpendicular to the working plane in order to use the optical marker) in the image pickup direction to pick up the working plane. Furthermore, since this embodiment determines the correction parameter from the working area and image pickup area that are specified, it is applicable even if the working area is not flat.

Although the above embodiment describes the example that specifies one working area and one correction parameter, a plurality of working areas or correction parameters may be specified. For example, the robot 110 may perform an operation to hold the workpiece 150 placed in a first working area A and to put the workpiece 150 into a box placed in a second working area B that is different from the first working area A. In this case, the correction parameter determination module 302 determines the first correction parameter in the first working area A in which the workpiece 150 is held. Similarly, the correction parameter determination module 302 determines a second correction parameter in the second working area B in which the workpiece 150 is put. Then, the correction parameter determination module 301 stores the information about the first working area A with the information about the first correction parameter in the storage unit 202 in association with each other. Moreover, the correction parameter determination module 302 stores the information about the second working area B and the information about the second correction parameter in the storage unit 202 in association with each other. These pieces of information are stored by a table format etc. Accordingly, this embodiment is applicable even to a case where one robot 110 works in different working areas.

Moreover, although the embodiments mentioned above describe the example in which the image pickup apparatus 120 is attached to the robot 110, the image pickup apparatus may be attached to a robot other than the robot that works as long as presumption of coordinate systems is available. Then, the image pickup apparatus 120 can change a focus, a field angle, etc., and the attached position of the image pickup apparatus 120 to the robot 110 can also be changed arbitrarily.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2019-186153, filed Oct. 9, 2019 and No. 2020-056366, filed Mar. 26, 2020, which are hereby incorporated by reference herein in their entireties.

What is claimed is:

1. An image processing apparatus for processing an image picked up by an image pickup apparatus attached to a robot, the image processing apparatus comprising:
a memory device that stores instructions; and
at least one processor that executes the instructions to:
specify a working area of the robot based on teaching point information showing a plurality of designated teaching points, each of which:
corresponds to a specific position and has been registered by a user operating the robot; and
is designated in a state where a screen is displaying an image that the image pickup apparatus is currently capturing and a setting item for specifying the working area;
specify an image pickup area of the image pickup apparatus that includes the specified working area;
determine an image pickup posture of the robot based on the specified image pickup area; and
display on the screen, superimposed on the displayed image, at least one of first information showing the working area or second information about the plurality of designated teaching points.

2. The image processing apparatus according to claim 1, wherein the at least one processor specifies the working area based on a position of the image pickup apparatus attached to the robot and a field angle of the image pickup apparatus picks up.

3. The image processing apparatus according to claim 1, wherein the at least one processor determines the image pickup posture at which a resolution of the picked-up image is maximized.

4. The image processing apparatus according to claim 1, wherein the at least one processor executes the instructions to designate a margin of the working area to the image pickup area.

5. The image processing apparatus according to claim 4, wherein the designated working area is wider than the image pickup area.

6. The image processing apparatus according to claim 1, wherein the at least one processor executes the instructions to determine whether to allow a tilt of a posture of the robot when the image pickup posture is determined.

7. The image processing apparatus according to claim 1, wherein the at least one processor executes the instructions to store the first information, which includes information about a plurality of working areas and the second information, which includes information about a plurality of image pickup postures, in a storage unit in association with each other.

8. The image processing apparatus according to claim 1, wherein the at least one processor executes the instructions to determine a correction parameter for correcting control of the robot based on the working area and the image pickup area that are specified.

9. The image processing apparatus according to claim 8, wherein the at least one processor executes the instructions to store third information that specifies the image pickup area corresponding to each of a plurality of optical properties.

10. The image processing apparatus according to claim 8, wherein the at least one processor executes the instructions to determine the correction parameter based on a phase of the robot, in a state where the phase of the robot at a time of obtaining a workpiece is designated.

11. The image processing apparatus according to claim 8, wherein information about each of a plurality of working areas is stored in association with the corresponding correction parameter.

12. The image processing apparatus according to claim 8, wherein an attached position of the image pickup apparatus in relation to the robot, a field angle of the image pickup apparatus, and a focus of the image pickup apparatus are variable.

13. An image processing apparatus for processing an image picked up by an image pickup apparatus attached to a robot, the image processing apparatus comprising:
a memory device that stores instructions; and
at least one processor that executes the instructions to:
display a screen including:
an entry field to which teaching points are entered;
a first button that designates execution of a process that determines an image pickup posture of the robot; and
an image that the image pickup apparatus is currently picking up and a setting item for specifying a working area of the robot;
specify the working area of the robot based on teaching point information showing the entered teaching points, each of which:
corresponds to a specific position and has been registered by a user operating the robot; and
is designated in a state where the screen is displaying;
specify an image pickup area of the image pickup apparatus that includes the specified working area; and
determine an image pickup posture of the robot based on the specified image pickup area in a state where the first button is operated;
wherein the screen displays, superimposed on the displayed image, at least one of first information showing the working area or second information about the entered teaching points.

14. The image processing apparatus according to claim 13, wherein the at least one processor executes the instructions to:
display another screen including an entry field for entering the specified working area and a second button that designates execution of a process that determines a correction parameter that corrects control of the robot; and determine the correction parameter based on the working area and the image pickup area in a state where the second button is operated.

15. A control method for an image processing apparatus that processes an image picked up by an image pickup apparatus attached to a robot, the control method comprising:
  specifying a working area of the robot based on teaching point information showing a plurality of designated teaching points, each of which:
    corresponds to a specific position and has been registered by a user operating the robot; and
    is designated in a state where a screen is displaying an image that the image pickup apparatus is currently capturing and a setting item for specifying the working area;
  specifying an image pickup area of the image pickup apparatus that includes the specified working area;
  determining an image pickup posture of the robot based on the specified image pickup area; and
  displaying on the screen, superimposed on the displayed image, at least one of first information showing the working area or second information about the plurality of designated teaching points.

16. A non-transitory computer-readable storage medium storing a control program executable by a computer to execute a control method for an image processing apparatus that processes an image picked up by an image pickup apparatus attached to a robot, the control method comprising:
  specifying a working area of the robot based on teaching point information showing a plurality of designated teaching points, each of which:
    corresponds to a specific position and has been registered by a user operating the robot; and
    is designated in a state where a screen is displaying an image that the image pickup apparatus is currently capturing and a setting item for specifying the working area;
  specifying an image pickup area of the image pickup apparatus so as to include the specified working area;
  determining an image pickup posture of the robot based on the specified image pickup area; and
  displaying on the screen, superimposed on the displayed image, at least one of first information showing the working area or second information about the plurality of designated teaching points.

\* \* \* \* \*